US011543565B2

(12) United States Patent
Meng et al.

(10) Patent No.: US 11,543,565 B2
(45) Date of Patent: Jan. 3, 2023

(54) DISPLAY PANEL, DISPLAY DEVICE AND DISPLAY METHOD

(71) Applicant: BOE TECHNOLOGY GROUP CO., LTD., Beijing (CN)

(72) Inventors: Xiandong Meng, Beijing (CN); Wei Wang, Beijing (CN); Tao Hong, Beijing (CN); Zhenxing Zhou, Beijing (CN); Gaolei Xue, Beijing (CN); Qiuyu Ling, Beijing (CN); Jifeng Tan, Beijing (CN); Xianqin Meng, Beijing (CN); Xiaochuan Chen, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 427 days.

(21) Appl. No.: 16/634,621

(22) PCT Filed: Dec. 4, 2018

(86) PCT No.: PCT/CN2018/119207
§ 371 (c)(1),
(2) Date: Jan. 28, 2020

(87) PCT Pub. No.: WO2020/113428
PCT Pub. Date: Jun. 11, 2020

(65) Prior Publication Data
US 2021/0072429 A1 Mar. 11, 2021

(51) Int. Cl.
*G02B 3/00* (2006.01)
*G02B 5/30* (2006.01)
(Continued)

(52) U.S. Cl.
CPC ......... *G02B 3/0068* (2013.01); *G02B 5/3016* (2013.01); *G02B 27/0172* (2013.01); *G02B 27/288* (2013.01)

(58) Field of Classification Search
CPC ................ G02B 3/0068; G02B 5/3016; G02B 27/0172; G02B 27/288
(Continued)

(56) References Cited

U.S. PATENT DOCUMENTS 8,964,299 B2  2/2015  Chang
9,946,071 B2  4/2018  Schowengerdt
(Continued)

FOREIGN PATENT DOCUMENTS

CN  103852891 A  6/2014
CN  104755968 A  7/2015
(Continued)

OTHER PUBLICATIONS

Second Chinese Office Action dated Feb. 7, 2022 in Chinese Application No. 201880002762.1 with English translation.
(Continued)

*Primary Examiner* — Edward J Glick
*Assistant Examiner* — William D Peterson
(74) *Attorney, Agent, or Firm* — Collard & Roe, P.C.

(57) ABSTRACT

A display panel, a display device and a display method. The display panel includes a first microlens array, a pixel island array and a second lens. The pixel island array is configured to display a plurality of sub-original images. The first microlens array is configured to converge light emitted from the plurality of sub-original images so as to obtain imaging light, and the imaging light is capable of forming a first virtual image. The second lens is on a user viewing side of the display panel relative to the first microlens array, and the second lens is configured to converge the imaging light so as to obtain a second virtual image. The first virtual image is a virtual image in which the plurality of sub-original images are stitched and enlarged, and the second virtual image is an enlarged virtual image of the first virtual image.

20 Claims, 13 Drawing Sheets

(51) Int. Cl.
*G02B 27/01* (2006.01)
*G02B 27/28* (2006.01)

(58) Field of Classification Search
USPC .......................................................... 359/489
See application file for complete search history.

(56) References Cited

U.S. PATENT DOCUMENTS

| | | | |
|---|---|---|---|
| 9,977,248 | B1 | 5/2018 | Xie |
| 10,073,201 | B2 | 9/2018 | Ma et al. |
| 10,267,954 | B2 | 4/2019 | Wang et al. |
| 10,469,833 | B2 | 11/2019 | Hua et al. |
| 2001/0043163 | A1 | 11/2001 | Waldern et al. |
| 2004/0108971 | A1 | 6/2004 | Waldern et al. |
| 2014/0118829 | A1* | 5/2014 | Ma .................... G02B 5/1885 359/630 |
| 2015/0049390 | A1 | 2/2015 | Lanman et al. |
| 2017/0269367 | A1 | 9/2017 | Qin |
| 2017/0269369 | A1 | 9/2017 | Qin |
| 2017/0357100 | A1 | 12/2017 | Ouderkirk et al. |
| 2018/0090058 | A1 | 3/2018 | Chen et al. |

FOREIGN PATENT DOCUMENTS

| | | |
|---|---|---|
| CN | 105717640 A | 6/2016 |
| CN | 105739093 A | 7/2016 |
| CN | 105934902 A | 9/2016 |
| CN | 106154550 A | 11/2016 |
| CN | 106263217 A | 1/2017 |
| CN | 106662731 A | 5/2017 |
| CN | 106873161 A | 6/2017 |
| CN | 206573783 U | 10/2017 |
| CN | 107561723 A | 1/2018 |
| CN | 108375840 A | 8/2018 |
| CN | 207833115 U | 9/2018 |
| CN | 108710217 A | 10/2018 |
| CN | 207946601 U | 10/2018 |
| CN | 108919531 A | 11/2018 |
| CN | 109709675 A | 5/2019 |
| JP | 2000506998 A | 6/2000 |
| JP | 2006-154280 A | 6/2006 |
| WO | 2014/066662 A1 | 5/2014 |
| WO | 2018/023987 A1 | 2/2018 |
| WO | 2018/132302 A1 | 7/2018 |

OTHER PUBLICATIONS

Chinese Office Action in Chinese Application No. 201880002762.1, with English translation.
International Search Report of PCT/CN2018/119207 in Chinese, dated Aug. 27, 2019, with English translation.
Extended European Search Report in European Application No. 18927227.1 dated Jun. 20, 2022.
Japanese Office Action in Japanese Application No. 2019-568151 dated Oct. 31, 2022.

* cited by examiner

DISPLAY PANEL, DISPLAY DEVICE AND DISPLAY METHOD

CROSS REFERENCE TO RELATED APPLICATIONS

This application is the National Stage of PCT/CN2018/119207 filed on Dec. 4, 2018, the disclosure of which is incorporated by reference.

TECHNICAL FIELD

Embodiments of the present disclosure relate to a display panel, a display device and a display method.

BACKGROUND

An augmented reality (AR) technology is a new technology that seamlessly integrates real world information and virtual world information. With the augmented reality technology, by means of computers and other scientific technologies, physical information (visual information, sound, taste, touch, and etc.), which is difficult to experience within a certain temporal and spatial range in the real world, may be simulated and then superimposed, so that virtual information may be applied to the real world, that is, may be perceived by human beings, thereby achieving sensory experiences beyond reality. With the augmented display technology, the virtual world and the real world may be superimposed on a screen in real time for display and may also interact with each other.

SUMMARY

At least one embodiment of the present disclosure provides a display panel, which includes a first microlens array, a pixel island array and a second lens. The pixel island array is configured to display a plurality of sub-original images. The first microlens array is configured to converge light emitted from the plurality of sub-original images so as to obtain imaging light, and a first virtual image can be formed by the imaging light on a side of the first microlens array which is away from a user viewing side of the display panel. The second lens is on the user viewing side of the display panel relative to the first microlens array, and the second lens is configured to converge the imaging light so as to obtain a second virtual image. The first virtual image is a virtual image in which the plurality of sub-original images are stitched and enlarged, and the second virtual image is an enlarged virtual image of the first virtual image.

For example, in the display panel provided by at least one embodiment of the present disclosure, the second lens is a polarized lens, configured to modulate incident light having a first polarization direction and transmit incident light having a second polarization direction perpendicular to the first polarization direction, and the pixel island array is configured to emit first polarized light having the first polarization direction.

For example, in the display panel provided by at least one embodiment of the present disclosure, the polarized lens includes a liquid crystal lens or a lens made of a birefringent material.

For example, the display panel provided by at least one embodiment of the present disclosure further includes a first polarizer. The first polarizer is configured to filter ambient light incident from a back side which is opposite to the user viewing side of the display panel, so as to obtain second polarized light having the second polarization direction.

For example, in the display panel provided by at least one embodiment of the present disclosure, the first microlens array and the pixel island array are between the first polarizer and the second lens.

For example, in the display panel provided by at least one embodiment of the present disclosure, a display surface of the pixel island array is provided with a second polarizer so as to exit the first polarized light having the first polarization direction.

For example, the display panel provided by at least one embodiment of the present disclosure further includes a first substrate. The first substrate is a transparent substrate, the first microlens array and the pixel island array are on the first substrate, and a display surface of the pixel island array faces the first microlens array.

For example, in the display panel provided by at least one embodiment of the present disclosure, the first microlens array has a transmissive structure, and the first microlens array is between the pixel island array and the second lens in a direction perpendicular to the first substrate.

For example, the display panel provided by at least one embodiment of the present disclosure further includes a third microlens array. The third microlens array is on a first side of the first substrate, the first side of the first substrate faces a back side which is opposite to the user viewing side of the display panel, and the third microlens array is configured to compensate for deflection effects of the first microlens array on ambient light.

For example, in the display panel provided by at least one embodiment of the present disclosure, a center of the first microlens array is aligned with a center of the third microlens array, in a direction perpendicular to the first substrate.

For example, in the display panel provided by at least one embodiment of the present disclosure, the first microlens array includes a plurality of first microlenses, the third microlens array includes a plurality of third microlenses, and the plurality of first microlenses correspond to the plurality of third microlenses one by one, and each of the first microlenses is arranged to overlap a corresponding third microlens in a direction perpendicular to the first substrate.

For example, in the display panel provided by at least one embodiment of the present disclosure, the pixel island array is on a first side of the first substrate, the first microlens array is on a second side of the first substrate, and the second side of the first substrate faces the user viewing side of the display panel, and the second lens is on a side of the first microlens array which is away from the first substrate.

For example, the display panel provided by at least one embodiment of the present disclosure further includes a first flat layer. The first flat layer is on a side of the pixel island array which is away from the first substrate, and between the pixel island array and the third microlens array.

For example, the display panel provided by at least one embodiment of the present disclosure further includes a second flat layer. The second flat layer is on a side of the third microlens array which is away from the first flat layer, and between the third microlens array and a first polarizer, and refractive index of the second flat layer is different from refractive index of the third microlens array.

For example, in the display panel provided by at least one embodiment of the present disclosure, the first microlens array has a reflective structure, and the pixel island array is between the first microlens array and the second lens in a direction perpendicular to the first substrate.

For example, in the display panel provided by at least one embodiment of the present disclosure, the first microlens array includes a plurality of first microlenses, and a surface of the plurality of first microlenses which is away from the pixel island array has a transflective film.

For example, in the display panel provided by at least one embodiment of the present disclosure, the first microlens array is on a first side of the first substrate, the pixel island array is on a second side of the first substrate, the first side of the first substrate faces a back side which is opposite to the user viewing side of the display panel, the second side of the first substrate faces the user viewing side of the display panel, and a first polarizer is on a side of the first microlens array which is away from the first substrate.

For example, the display panel provided by at least one embodiment of the present disclosure further includes a compensation layer. The compensation layer is between the first microlens array and a first polarizer, and is configured to compensate for deflection effects of the first microlens array on ambient light.

For example, in the display panel provided by at least one embodiment of the present disclosure, the first microlens array is in direct contact with the compensation layer, and refractive index of the first microlens array and refractive index of the compensation layer are the same.

For example, the display panel provided by at least one embodiment of the present disclosure further includes a second substrate. The second substrate is a transparent substrate and is combined with the first substrate in parallel, the second substrate is closer to the user viewing side of the display panel relative to the first substrate, and the second lens is arranged on the second substrate.

For example, in the display panel provided by at least one embodiment of the present disclosure, the second lens is arranged on a side of the second substrate which is close to or away from the first substrate.

For example, in the display panel provided by at least one embodiment of the present disclosure, the pixel island array includes a plurality of pixel islands spaced apart from each other, a gap between pixel islands allows ambient light from a back side of the display panel to pass through, and the back side of the display panel is opposite to the user viewing side of the display panel. The first microlens array includes a plurality of first microlenses, and the plurality of pixel islands correspond to the plurality of first microlenses one by one. Each of the first microlenses is arranged to overlap a corresponding pixel island in a direction perpendicular to the display panel.

For example, in the display panel provided by at least one embodiment of the present disclosure, a center of the pixel island array is aligned with a center of the first microlens array in the direction perpendicular to the display panel.

For example, in the display panel provided by at least one embodiment of the present disclosure, each pixel island includes a plurality of pixels, and each pixel may be an organic light emitting diode pixel, an inorganic light emitting diode pixel, or a liquid crystal display pixel.

For example, the display panel provided by at least one embodiment of the present disclosure further includes a shielding layer. The shielding layer is arranged between adjacent pixel islands in a direction parallel to the display panel and configured to prevent light emitted from the adjacent pixel islands from interfering with each other.

For example, in the display panel provided by at least one embodiment of the present disclosure, the shielding layer includes a plurality of sub-shielding units, and each pixel island is partially surrounded by at least one sub-shielding unit in the direction parallel to the display panel.

For example, in the display panel provided by at least one embodiment of the present disclosure, a distance from the first virtual image to the display panel is smaller than a distance from the second virtual image to the display panel.

For example, in the display panel provided by at least one embodiment of the present disclosure, the first virtual image includes a plurality of sub-virtual images, the plurality of sub-virtual images correspond to the plurality of sub-original images one by one, and the imaging light includes a plurality of sub-imaging light. The first microlens array is configured to respectively converge the light emitted from the plurality of sub-original images so as to obtain the plurality of sub-imaging light, the plurality of sub-imaging light is capable of being imaged as the plurality of sub-virtual images respectively, and the plurality of sub-virtual images are stitched with each other so as to obtain a consecutive first virtual image.

At least one embodiment of the present disclosure further provides a display device, which includes the display panel according to any one of embodiments described above.

At least one embodiment of the present disclosure further provides a display method, applicable to the display panel according to any one of embodiments described above. The display method includes: displaying the plurality of sub-original images through the pixel island array, converging the light emitted from the plurality of sub-original images so as to obtain the imaging light, in which the imaging light is capable of forming the first virtual image on the side of the first microlens array which is away from the user viewing side of the display panel, and converging the imaging light so as to obtain the second virtual image, in which the first virtual image is the virtual image in which the plurality of sub-original images are stitched and enlarged, and the second virtual image is the enlarged virtual image of the first virtual image.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical solutions and advantages of the embodiments of the present disclosure, the technical solutions of the embodiments of the present disclosure will be described clearly and completely in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The terms "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In order to keep the following description of the embodiments of the present disclosure clear and concise, detailed descriptions of known functions and known components are omitted from the present disclosure.

Near-eye display is also referred to as head-mounted display or wearable display, which may create a virtual image within a field of view of one eye or both eyes. The near-eye display may be applied to fields such as aviation, military, medical, digital soldier system, aiming system, etc.

Figure 1:
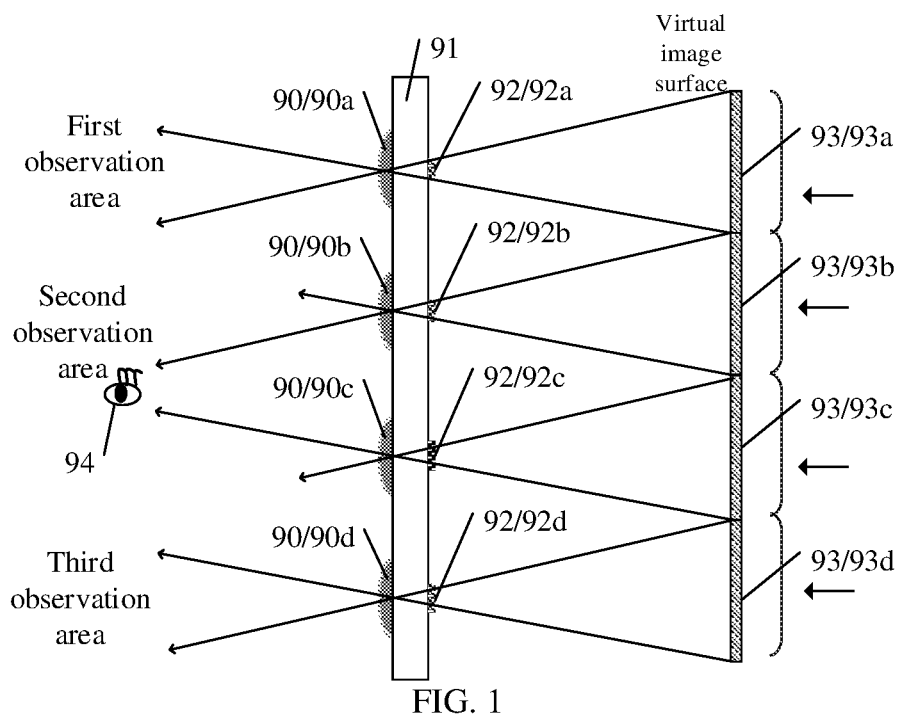
FIG. 1 is a schematic diagram of basic principles of near-eye augmented reality display.

In the field of augmented reality display, the near-eye AR display may be implemented by stitching pixel islands. FIG. 1 is a schematic diagram of basic principles of near-eye augmented reality display. As illustrated in FIG. 1, a near-eye display panel includes a substrate 91, a microlens array 90 and a pixel group array 92. The pixel group array 92 includes a first pixel group 92a, a second pixel group 92b, a third pixel group 92c and a fourth pixel group 92d. The microlens array 90 includes a microlens 90a, a microlens 90b, a microlens 90c and a microlens 90d. The microlens 90a images an image displayed by the first pixel group 92a on a virtual image surface so as to obtain a sub-virtual image 93a, the microlens 90b images an image displayed by the second pixel group 92b on the virtual image surface so as to obtain a sub-virtual image 93b, the microlens 90c images an image displayed by the third pixel group 92c on the virtual image surface so as to obtain a sub-virtual image 93c, and the microlens 90d images an image displayed by the fourth pixel group 92d on the virtual image surface so as to obtain a sub-virtual image 93d. The sub-virtual image 93a, the sub-virtual image 93b, the sub-virtual image 93c and the sub-virtual image 93d are stitched for forming a consecutive virtual image 93, and the virtual image 93 is an image obtained by imaging an image displayed by the pixel group array 92 through the microlens array 90. Because the angle of the field of view of each microlens (microlens 90a, microlens 90b, microlens 90c or microlens 90d) is less than 3 degrees, during the near-eye display, a human eye can only see a portion of the virtual image picture formed by stitching images displayed by 1-2 pixel groups, while cannot simultaneously observe the picture formed by the entire pixel group array 92. Such display effect is unacceptable in the AR display field.

As illustrated in FIG. 1, when an eye 94 is in a second observation area, the eye 94 may only receive the light incident to the second observation area, that is, may only view a portion of the virtual image picture formed by stitching the sub-virtual image 93b and the sub-virtual image 93c, while the eye 94 cannot receive the light incident to virtual image pictures for a first observation area and a third observation area, thus may not view the virtual image picture formed by stitching the sub-virtual image 93a and the sub-virtual image 93d.

In addition, for the near-eye display, the depth-of-field distance is 1-2 meters or more. In the near-eye display panel illustrated in FIG. 1, the aperture of a microlens is about 1 mm, while it is impossible to implement the depth-of-field distance of 1-2 meters using the microlens with the aperture of 1 mm. According to the actual imaging capability evaluation of microlenses, the maximum imaging depth of field distance of the near-eye display panel illustrated in FIG. 1 is less than 10 cm and the depth of field distance is smaller.

Some embodiments of the present disclosure provide a display panel, a display device and a display method. The display panel implements image stitching through a first microlens array, and then implements near-eye display and far depth of field through a second lens, so that more or complete virtual images may be viewed and the depth of field is far away. The display panel at least has the following technical characteristics and advantages: high light efficiency, large field of view, thinness, far depth of field, integration of pixel islands.

Embodiments of the present disclosure will be described in detail below with reference to the accompanying drawings, however the present disclosure is not limited to these specific embodiments.

Figure 2:
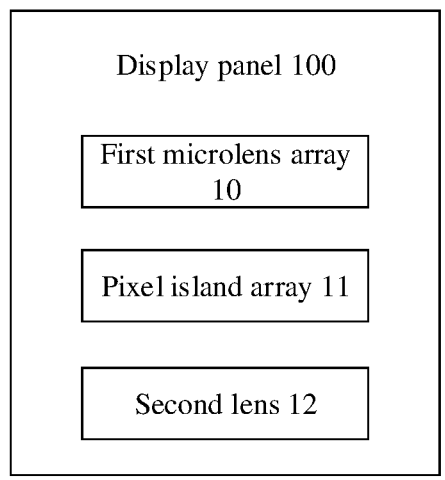
FIG. 2 is a schematic block diagram of a display panel provided by an embodiment of the present disclosure.
Figure 3A:
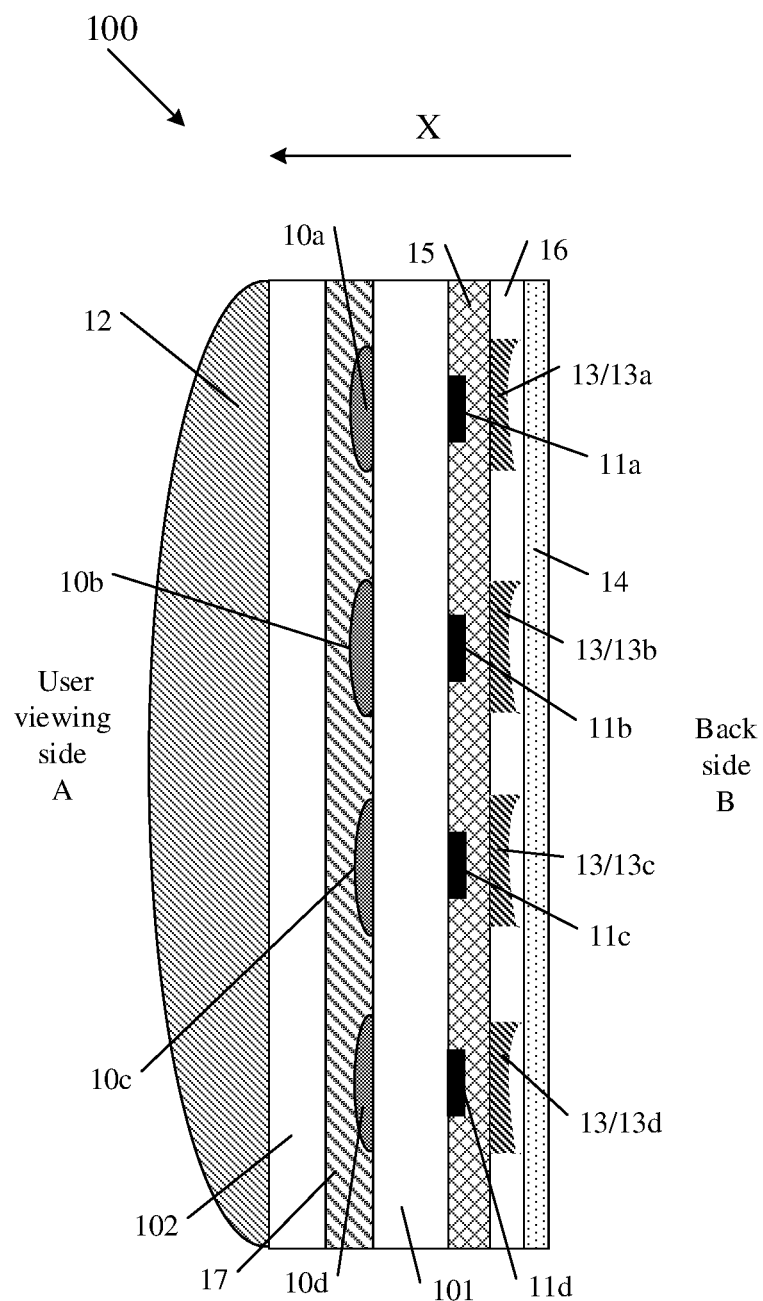
FIG. 3A is a schematic diagram of a structure of a display panel provided by an embodiment of the present disclosure.
Figure 3B:
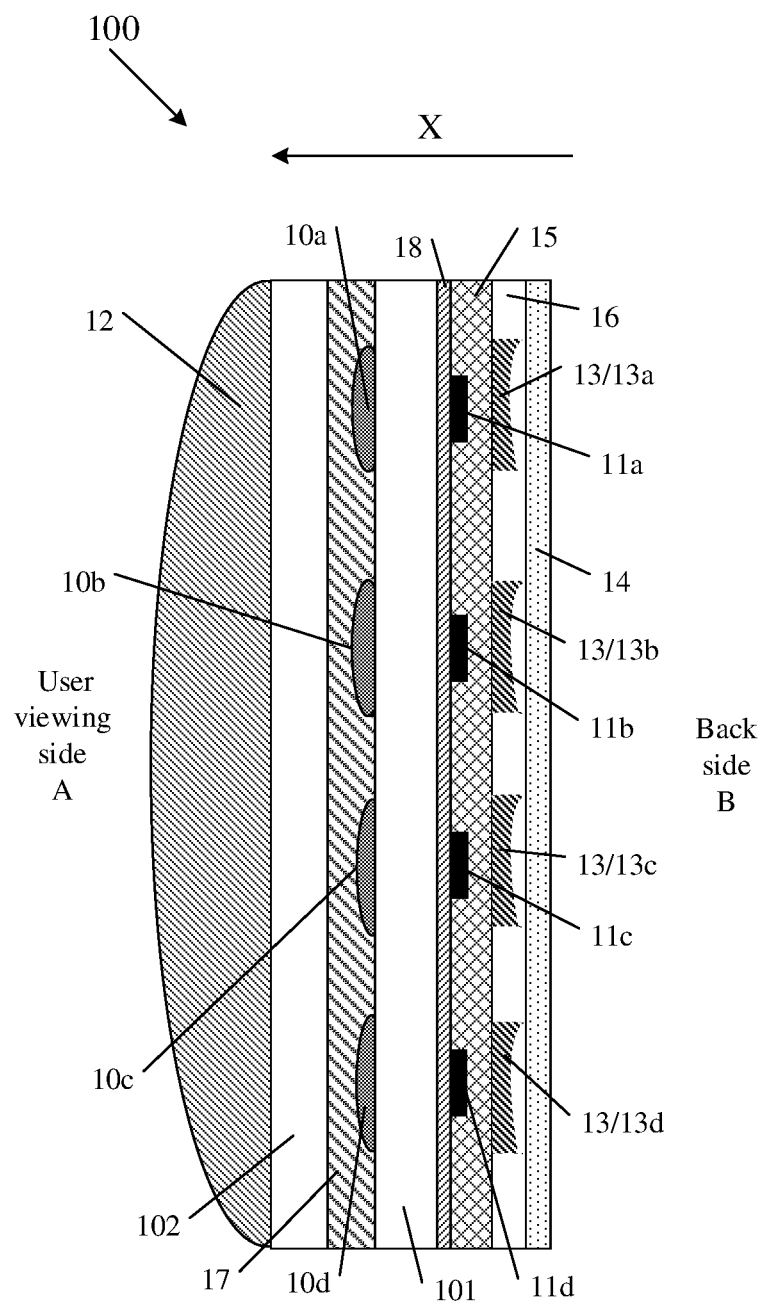
FIG. 3B is a schematic diagram of a structure of another display panel provided by an embodiment of the present disclosure.
Figure 3C:
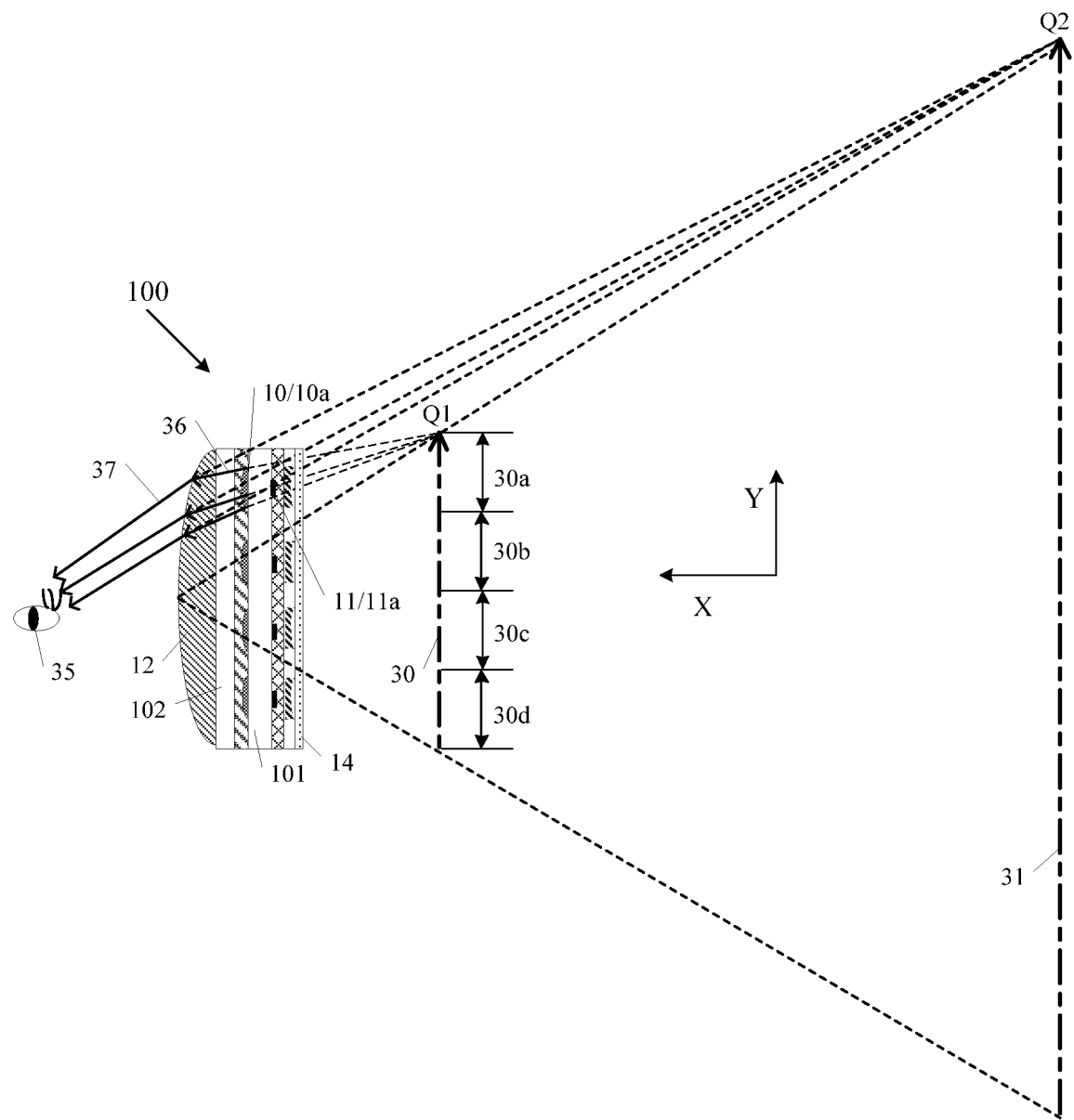
FIG. 3C is a schematic diagram of imaging of a display panel provided by an embodiment of the disclosure.

FIG. 2 is a schematic block diagram of a display panel provided by an embodiment of the present disclosure, FIG. 3A is a schematic diagram of a structure of a display panel provided by an embodiment of the present disclosure, FIG. 3B is a schematic diagram of a structure of another display panel provided by an embodiment of the present disclosure, and FIG. 3C is a schematic diagram of imaging of a display panel provided by an embodiment of the disclosure.

For example, as illustrated in FIGS. 2 and 3A, a display panel 100 includes a first microlens array 10, a pixel island array 11 and a second lens 12. The pixel island array 11 is configured to display a plurality of sub-original images. The first microlens array 10 is configured to converge light emitted from the plurality of sub-original images so as to obtain imaging light, and a first virtual image can be formed by the imaging light on a side of the first microlens array 10 which is away from a user viewing side A of the display panel 100. As illustrated in FIGS. 3A to 3C, the second lens 12 is located on the user viewing side A of the display panel 100 relative to the first microlens array 10, that is, the second lens 12 is closer to the user viewing side A of the display panel 100 relative to the first microlens array 10, and the second lens 12 is configured to converge imaging light 36 so as to obtain a second virtual image 31. The first virtual image 30 is a virtual image in which the plurality of sub-original images are stitched and enlarged, and the second virtual image 31 is an enlarged virtual image of the first virtual image 30, that is, the size of the first virtual image 30 is smaller than the size of the second virtual image 31.

For example, the display panel 100 provided by the embodiments of the present disclosure may be applied to augmented reality (AR) displays. In the present disclosure, the pixel island array 11 is directly located in front of a human eye, and light emitted from the pixel island array 11 is directly projected to the human eye through optical deflection of multi-layer lenses (e.g., the first microlens array 10 and the second lens 12), so that the human eye may see the display contents of the pixel island array 11. While with respect to a user, ambient light outside the display panel may be projected to the human eye from transparent spacing regions in the pixel island array 11, so that the human eye may see scenes outside the display panel 100, thereby achieving the augmented reality display effect. Compared with AR display devices adopting the waveguide technology and the like, the AR display including the display panel 100 provided by the embodiments of the present disclosure has higher light energy utilization rate and display effect.

For example, as illustrated in FIG. 3C, the distance between the first virtual image 30 and the display panel 100 is smaller than the distance between the second virtual image 31 and the display panel 100, that is, an imaging plane of the first virtual image 30 is between the display panel 100 and an imaging plane of the second virtual image 31. The first virtual image 30 and the second virtual image 31 are both imaged on a back side (or outside) B which is opposite to the user viewing side (or inside) A of the display panel 100. The user viewing side A and the back side B are two sides of the display panel 100, respectively.

For example, in terms of optical imaging, a plurality of sub-original images displayed by the pixel island array 11 are objects of the first microlens array 10, the first virtual image 30 is an image of the first microlens array 10, and the first microlens array 10 may enlarge and stitch the plurality of sub-original images into a consecutive first virtual image 30. It should be noted that, in practice, the first virtual image 30 is not actually imaged.

Accordingly, the first virtual image 30 is an object of the second lens 12, and the second virtual image 31 is an image of the second lens 12. The second lens 12 may enlarge and image the consecutive first virtual image 30 at a certain position with a far depth of field so as to obtain a virtual image having the far depth of field, i.e., the second virtual image 31 illustrated in FIG. 3C, thereby achieving the augmented reality display effect having greater depth of field. The second lens 12 may deflect the light of the first virtual image 30 for entering into an observation area, such as a field of view that a human eye can view, so that the human eye may view part or all of the second virtual image 31 simultaneously, thereby achieving the technical effect of near-eye display.

For example, as illustrated in FIG. 3C, an imaging process of the first microlens array 10 and the second lens 12 is described by taking Q1 point on the first virtual image 30 as an example. Light emitted from one point in a first pixel island 11a in the pixel island array 11 is imaged as Q1 point in the first virtual image 30 through a first microlens 10a in the first microlens array 10, and Q1 point in the first virtual image 30 is imaged as Q2 point in the second virtual image 31 through the second lens 12. As illustrated in FIG. 3C, first polarized light emitted from one point in the first pixel island 11a becomes the imaging light 36 (e.g., first imaging light) after being converged by the first microlens 10a. Reverse extension lines of the first imaging light 36 may converge at Q1 point in the first virtual image 30. The first imaging light 36 is incident into the second lens 12, the first imaging light 36 is deflected when passing through the second lens 12, and the light exited from the second lens 12 is second imaging light 37. The second imaging light 37 may be incident into a human eye 35, and reverse extension lines of the second imaging light 37 may converge at Q2 point in the second virtual image 31. Finally, the human eye 35 may see Q2 point in the second virtual image 31. The first imaging light 36 and the second imaging light 37 are both polarized light having a first polarization direction.

It should be noted that in the example illustrated in FIG. 3C, light emitted from a pixel point in the first pixel island 11a enters the human eye 35 passing through the first microlens 10a and then the second lens 12. The solid line with arrow in FIG. 3C indicates a propagation path of the actual light, while the dashed line indicates a reverse extension line of the actual light.

In the display panel 100 provided by the embodiments of the present disclosure, the pixel island array 11 is used to implement image display, the first microlens array 10 is used to implement image stitching, and the second lens 12 is used to implement near-eye display. Therefore, the field of view of the display panel 100 is determined by the second lens 12, for example, the field of view of the display panel 100 is determined by surface-type parameters (e.g., focal length, aperture, and etc.) of the second lens 12. Compared with a conventional AR display device using waveguide technology or the like, the AR display including the display panel 100 provided by the embodiments of the present disclosure has a larger field of view. In addition, in this display panel 100, elements such as the first microlens array, the pixel island array, the second lens and the like may be fabricated to have a small structure, the object plane position of the second lens is the position of the first virtual image, and the second lens may be directly attached to or fabricated on a substrate, so that the overall structure of the display panel 100 is thinner and lighter. In addition, the depth of field of the near-eye display panel illustrated in FIG. 1 is limited by the imaging capability of the microlenses, so that the depth of field is very small. While in the display panel 100 provided by the embodiments of the present disclosure, the first microlens array 10 is only used to implement image stitching, the depth of field is determined by the second lens 12, and the aperture of the second lens 12 is relatively large, so that the display panel 100 has the technical effect of far depth of field.

For example, the second lens 12 is a polarized lens, which may be, for example, a convex lens. The second lens 12 is configured to modulate incident light having a first polarization direction and transmit incident light having a second polarization direction perpendicular to the first polarization direction. That is, the polarized lens may only have the effect as a lens on the polarized light having the first polarization direction, while the polarized lens is equivalent to flat glass for the polarized light having the second polarization direction. The pixel island array 11 is configured to emit first polarized light having the first polarization direction, so that the second lens 12 may modulate the first polarized light emitted by the pixel island array 11, thus the image displayed by the pixel island array 11 may finally be modulated by the second lens 12.

For example, the polarized lens includes a liquid crystal lens or a lens formed of a birefringent material, and the like.

Figure 4:
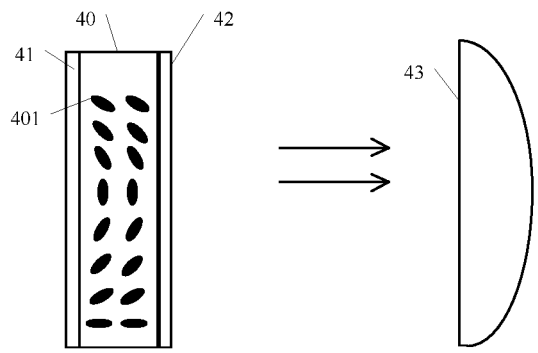
FIG. 4 is a schematic diagram of a structure of a liquid crystal lens provided by an embodiment of the present disclosure.

FIG. 4 is a schematic diagram of a structure of a liquid crystal lens provided by an embodiment of the present disclosure.

The liquid crystal is a biaxial crystal, and the liquid crystal lens only modulates polarized light having a first polarization direction, for example, that is, the liquid crystal lens may only have modulation effect on first polarized light having the first polarization direction. While for second polarized light having a second polarization direction, the refractive index of the liquid crystal layer in the liquid crystal lens for the second polarized light is always equal to a short axis refractive index, that is, the liquid crystal lens is equivalent to a parallel plate, and has no modulation effect on the second polarized light. Meanwhile, the focal length of the liquid crystal lens may be modulated in real time according to the applied modulation signals, therefore, the depth of field finally viewed by a human eye may also be modulated in real time, so that the display panel has the technical effect that the depth of field is controllable. As illustrated in FIG. 4, in some embodiments, the liquid crystal lens may include a liquid crystal cell 40, a first electrode 41 and a second electrode 42, and the liquid crystal cell 40 includes liquid crystal molecules 401. The first electrode 41 and the second electrode 42 are configured to control deflection angles of liquid crystal molecules in different regions so as to obtain the same phase distribution as a resin lens or a glass lens, thereby forming a lens. For example, when the deflection degree of each liquid crystal molecule is different, the focal length of the lens formed equivalently is also different, that is, the focal length of an optical liquid crystal lens may be adjusted by adjusting the deflection angles of the liquid crystal molecules in different regions.

For example, when deflection angles of liquid crystal molecules in each region of the liquid crystal cell 40 are illustrated in FIG. 4, an equivalent structure of the liquid crystal lens composed of the liquid crystal cell 40, the first electrode 41 and the second electrode 42 may be represented as a lens 43 illustrated in FIG. 4. For example, the lens 43 is a convex lens.

For example, the first electrode 41 includes a plurality of first sub-electrodes, the plurality of first sub-electrodes are insulated from each other, and the plurality of first sub-electrodes are strip electrodes. The second electrode 42 may include a plate electrode. It should be noted that the second electrode 42 may also include a plurality of second sub-electrodes, the plurality of second sub-electrodes are strip electrodes and are insulated from each other, and for example, the plurality of second sub-electrodes correspond to the plurality of first sub-electrodes one by one. As illustrated in FIG. 4, the first electrode 41 and the second electrode 42 may be on both sides of the liquid crystal cell 40, but the present disclosure is not limited thereto, and the first electrode 41 and the second electrode 42 may also be on a same side of the liquid crystal cell 40. The shape, actual number and position of the first electrode 41 and the second electrode 42 in the present disclosure are not limited as long as the first electrode 41 and the second electrode 42 may adjust deflection angle of each of the liquid crystal molecules 401 in the liquid crystal cell 40 as required.

For example, the first electrode 41 and the second electrode 42 are both transparent electrodes.

For example, the refractive index of a birefringent material which is related to the polarization direction of light waves is anisotropic. The birefringent material may include calcium carbonate crystal, Shi Ying crystal, mica crystal, sapphire crystal, etc.

For example, as illustrated in FIG. 3A, the display panel 100 further includes a first polarizer 14. For example, a transmission axis of the first polarizer 14 is parallel to a second polarization direction, so that after ambient light (i.e., natural light) passes through the first polarizer 14, it becomes polarized light having the second polarization direction, and the polarized light having the second polarization direction is not modulated by the second lens 12, that is, ambient light passing through the entire display panel 100 is not modulated by the second lens 12. More specifically, the first polarizer 14 is configured to filter ambient light incident from the back side B of the display panel 100 which is opposite to the user viewing side A of the display panel 100, so as to obtain second polarized light having the second polarization direction. The second lens 12 has no modulation effect on the second polarized light, that is, when the second polarized light passes through the second lens 12, its optical paths will not change and still propagate along a straight line, so that the scenes outside the display panel seen by a human eye are not affected and changed by the second lens 12. As a result, ambient light entering the display panel 100 from the back side B (i.e., external environment) is not modulated, but directly incident into the human eye, thereby achieving the augmented reality display effect. The first polarizer 14 is, for example, a wire grid polarizing layer or a PVA (polyvinyl alcohol) polarizer, and the embodiments of the present disclosure are not limited thereto.

For example, the first microlens array 10 and the pixel island array 11 are between the first polarizer 14 and the second lens 12.

For example, as illustrated in FIGS. 3A to 3C, the display panel 100 further includes a first substrate 101. The first substrate 101 is a transparent substrate, and the transparent substrate may be, for example, a glass substrate, a plastic substrate, or the like. The first microlens array 10, the pixel island array 11 and the first polarizer 14 are all arranged on the first substrate 101, i.e., the first substrate 101 provides supporting and protecting functions, and other structures including the second lens may also be sequentially laminated on the first substrate 101, thereby forming an overall structure.

For example, a projection of the first microlens array 10 on the first substrate 101 is within a projection of the second lens 12 on the first substrate 101. A center of the first microlens array 10 is aligned with a center of the second lens 12 in a direction perpendicular to the first substrate 101, that is, in the X direction illustrated in FIGS. 3A to 3C.

For example, in the direction perpendicular to the first substrate 101, the first polarizer 14 is on a first side of the first substrate 101, and the first side of the first substrate 101 faces the back side B of the display panel 100. The first microlens array 10 and the pixel island array 11 are between the first polarizer 14 and the second lens 12. A display surface of the pixel island array 11 faces the first microlens array 10, so that light emitted from the pixel island array 11 may be incident on the first microlens array 10 and converged by the first microlens array 10 so as to obtain the imaging light 36 which can form a consecutive first virtual image 30.

For example, as illustrated in FIG. 3B, the display surface of the pixel island array 11 may be provided with a second polarizer 18 so as to exit first polarized light having a first polarization direction. That is, the second polarizer 18 is arranged between the pixel island array 11 and the first microlens array 10 so as to ensure that the light incident on the first microlens array 10 is only the first polarized light emitted by the pixel island array 11, and to prevent stray light from interfering with the imaging effect. For example, the second polarizer 18 may be a wire grid layer fabricated on the first substrate.

For example, as illustrated in FIG. 3B, the second polarizer 18 may be a one-piece structure. The present disclosure is not limited to this, and the second polarizer may also include a plurality of sub-polarizers corresponding to the plurality of pixel islands in the pixel island array 11 one by one.

For example, as illustrated in FIGS. 3A and 3B, the display panel 100 further includes a second substrate 102. In this example, the second substrate 102 may share the supporting function of the first substrate 101, thereby reducing the difficulty of fabrication and improving the yield. The second substrate 102 is a transparent substrate and is combined with the first substrate 101 in parallel, on a second side of the first substrate 101 which faces the user viewing side A of the display panel 100. That is, the second substrate 102 is closer to the user viewing side A of the display panel 100 relative to the first substrate 101.

For example, as illustrated in FIGS. 3A and 3B, the display panel 100 may further include a third flat layer 17. The third flat layer 17 is between the first substrate 101 and the second substrate 102, covers the first microlens array 10 and functions as planarization. It should be noted that the refractive index of the third flat layer 17 is different from that of each of the first microlenses in the first microlens array 10.

For example, the second lens 12 is arranged on the second substrate 102. For example, in the example illustrated in FIG. 3A, the second lens 12 is arranged on a side of the second substrate 102 which is away from the first substrate 101. However, the present disclosure is not limited to this, and the second lens 12 may also be arranged on a side of the second substrate 102 which is close to the first substrate 101. Alternatively, both sides of the second substrate 102 are provided with one second lens 12, respectively.

For example, in some examples, the display panel 100 may not include the second substrate 102, in this case, the second lens 12 is also arranged on the first substrate 101. For example, the second lens 12 is on a side of the third flat layer 17 which is away from the first microlens array 10.

For example, as illustrated in FIGS. 3A and 3B, the first microlens array 10 may include a plurality of first microlenses, and the plurality of first microlenses are arranged adjacent to each other or spaced apart from each other. The pixel island array 11 includes a plurality of pixel islands, and the plurality of pixel islands are also spaced apart from each other. The spacing regions between the first microlenses are transparent, and the spacing regions between the plurality of pixel islands are also transparent, that is, a gap between adjacent pixel islands allows ambient light from the back side B of the display panel to pass through, and the ambient light may also pass through the gap between the adjacent first microlenses.

For example, the shape, material, refractive index or the like of each of the first microlenses in the first microlens array 10 may be designed according to actual application scenarios, and the embodiments of the present disclosure are not limited to this. Each of the first microlenses in the first microlens array 10 may have the same shape, material, refractive index, etc.

For example, the shape and size of each pixel island in the pixel island array 11 may be the same, or may not be the same.

For example, a plurality of pixel islands correspond to a plurality of first microlenses one by one. For example, in a direction perpendicular to the first substrate 101, each of the first microlenses is arranged to overlap a corresponding pixel island. In the example illustrated in FIGS. 3A to 3C, the first microlens array 10 includes a first microlens 10a, a first microlens 10b, a first microlens 10c and a first microlens 10d, and the pixel island array 11 includes a first pixel island 11a, a second pixel island 11b, a third pixel island 11c and a fourth pixel island 11d. The first microlens 10a corresponds to the first pixel island 11a, the first microlens 10b corresponds to the second pixel island 11b, the first microlens 10c corresponds to the third pixel island 11c, and the first microlens 10d corresponds to the fourth pixel island 11d.

For example, in a direction perpendicular to the first substrate 101, a center of the pixel island array 11 is aligned with a center of the first microlens array 10. The size of the pixel islands in the pixel island array 11, the gap between the pixel islands and the optical parameters (including aperture, focal length, etc.) of each of the first microlenses are selected, so that sub-original images displayed by all the pixel islands in the pixel island array 11 may be enlarged and stitched into a consecutive first virtual images 30 at a certain position with a virtual image distance.

For example, in a direction perpendicular to the first substrate 101, a projection of each pixel island on the first substrate 101 is within a projection of the corresponding first microlens on the first substrate 101.

For example, in a direction perpendicular to the first substrate 101, a center of each pixel island is aligned with a center of the corresponding first microlens, thereby ensuring that each of the first microlenses may enlarge the sub-original image displayed by the corresponding pixel island into the corresponding sub-virtual image.

Figure 5:
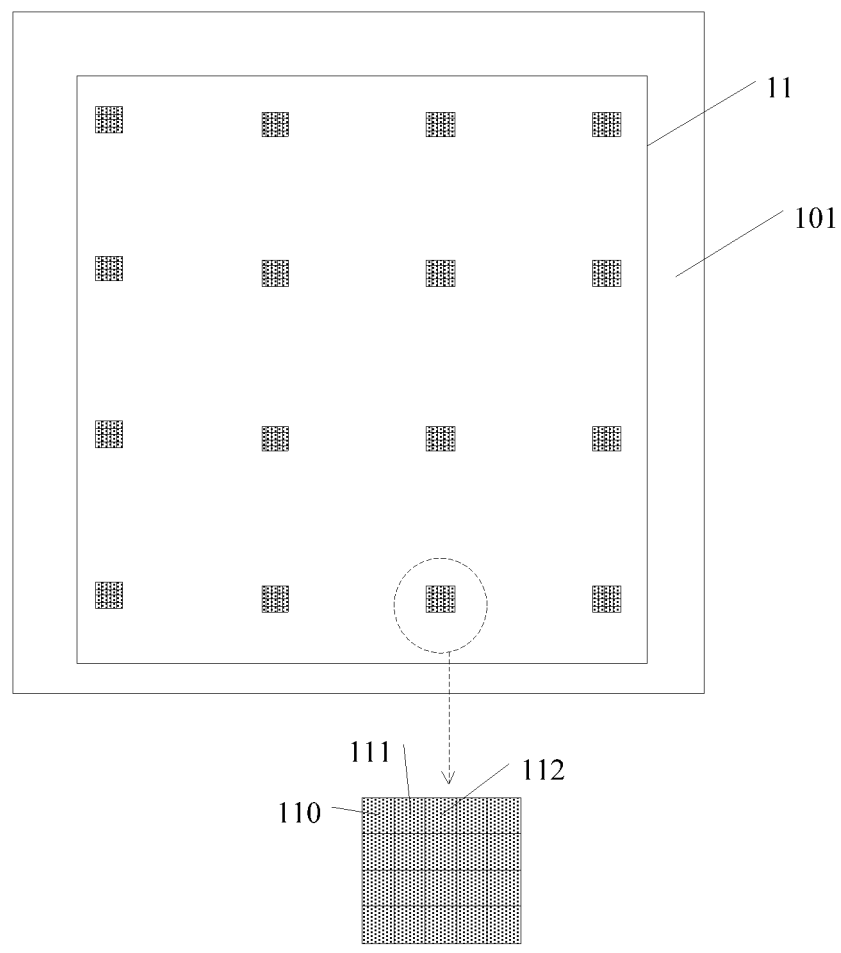
FIG. 5 is a schematic plan view of a pixel island array provided by an embodiment of the present disclosure.

FIG. 5 is a schematic plan view of a pixel island array provided by an embodiment of the present disclosure.

For example, as illustrated in FIG. 5, in some examples, the pixel island array 11 includes a plurality of pixel islands arranged in 4 rows and 4 columns.

For example, each pixel island includes a plurality of pixels, and each pixel may be an organic light emitting diode pixel, an inorganic light emitting diode pixel, a liquid crystal display pixel, a Micro-LED pixel, or the like.

For example, the display panel 100 provided by the embodiments of the present disclosure may implement colorized display. As illustrated in FIG. 5, in the enlarged schematic diagram of the pixel islands in the dashed circle frame, each pixel island includes 20 pixels, and the 20 pixels are arranged in 4 rows and 5 columns. For example, the display panel 100 may implement colorized stitching display. All pixels in each pixel island may emit light of a same color, while different pixel islands emit light of different colors. For example, adjacent three pixel islands in a same row respectively emit red light, blue light and green light, and the first virtual image stitched and formed finally is a color image. Alternatively, the display panel 100 may be a direct colorized display. For example, each pixel island includes at least a first pixel 110, a second pixel 111 and a third pixel 112, and the first pixel 110, the second pixel 111 and the third pixel 112 respectively emit light of different colors. For example, the first pixel 110 emits red light, the second pixel 111 emits blue light and the third pixel 112 emits green light.

For example, a plurality of pixel islands correspond to a plurality of sub-original images one by one.

Figure 6:
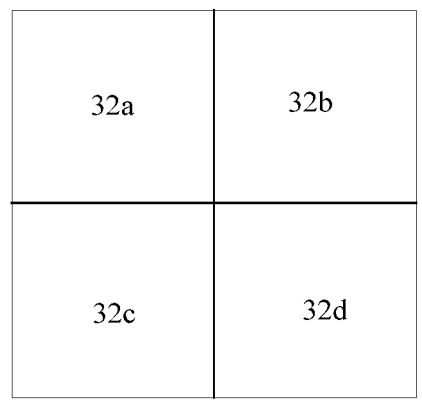
FIG. 6 is a schematic diagram of a plurality of sub-original images provided by an embodiment of the present disclosure.

FIG. 6 is a schematic diagram of a plurality of sub-original images provided by an embodiment of the present disclosure.

For example, in some examples, as illustrated in FIG. 6, a plurality of sub-original images include a first sub-original image 32a, a second sub-original image 32b, a third sub-original image 32c and a fourth sub-original image 32d, and the plurality of sub-original images constitute a complete original image. For example, the first pixel island 11a displays the first sub-original image 32a, the second pixel island 11b displays the second sub-original image 32b, the third pixel island 11c displays the third sub-original image 32c, and the fourth pixel island 11d displays the fourth sub-original image 32d.

For example, the shape and size of a plurality of sub-original images may be the same. For example, as illustrated in FIG. 6, the first sub-original image 32a, the second sub-original image 32b, the third sub-original image 32c and the fourth sub-original image 32d are all rectangular in shape and the same in size. However, the present disclosure is not limited to this, and in some examples, at least some of the sub-original images are different in size, in still other examples, at least some of the sub-original images are different in shape. For example, the plurality of sub-original images are all the same in shape, for example, all rectangular, but at least some of the sub-original images are different in size from each other. It should be noted that the actual number, size, shape or the like of the plurality of sub-original images may be divided according to actual needs, as long as it is ensured that the plurality of sub-original images may be stitched into a complete original image, and the embodiments of the present disclosure are not limited to this.

For example, the first virtual image 30 includes a plurality of sub-virtual images, and the plurality of sub-virtual images correspond to a plurality of sub-original images one by one. The imaging light 36 includes a plurality of sub-imaging light, and the first microlens array 10 is configured to respectively converge light emitted from the plurality of sub-original images so as to obtain the plurality of sub-imaging light, the plurality of sub-imaging light is capable of being respectively imaged as the plurality of sub-virtual images, the plurality of sub-virtual images are stitched with each other so as to obtain a consecutive first virtual image 30, and the plurality of sub-virtual images do not overlap each other in a direction perpendicular to the first substrate 101. As illustrated in FIG. 3C, in some examples, a plurality of sub-virtual images are respectively a first sub-virtual image 30a, a second sub-virtual image 30b, a third sub-virtual image 30c and a fourth sub-virtual image 30d, and the first microlens 10a converges light emitted from an image (e.g., the first sub-original image) displayed by the first pixel island 11a so as to obtain first sub-imaging light which is capable of being imaged as the first sub-virtual image 30a, and the first sub-virtual image 30a is an enlarged virtual image of the first sub-original image. The first microlens 10b converges light emitted from an image (e.g., the second sub-original image) displayed by the second pixel island 11b so as to obtain second sub-imaging light which is capable of being imaged as the second sub-virtual image 30b, and the second sub-virtual image 30b is an enlarged virtual image of the second sub-original image. The first microlens 10c converges light emitted from an image displayed by the third pixel island 11c (e.g., the third sub-original image) so as to obtain third sub-imaging light which is capable of being imaged as the third sub-virtual image 30c, and the third sub-virtual image 30c is an enlarged virtual image of the third sub-original image. The first microlens 10d converges light emitted from an image displayed on the fourth pixel island 11d (e.g., the fourth sub-original image) so as to obtain fourth sub-imaging light which is capable of being imaged as the fourth sub-virtual image 30d, and the fourth sub-virtual image 30d is an enlarged virtual image of the fourth sub-original image. For example, in a direction parallel to the first substrate 101, i.e., the Y direction in FIG. 3C, the first sub-virtual image 30a, the second sub-virtual image 30b, the third sub-virtual image 30c and the fourth sub-virtual image 30d are sequentially stitched for obtaining a first virtual image 30, and the first virtual image 30 is an enlarged virtual image of the complete original image displayed by the pixel island array 11.

For example, in some embodiments, the first microlens array 10 has a transmissive structure, and in a direction perpendicular to the first substrate 101, the first microlens array 10 is between the pixel island array 11 and the second lens 12, so that light emitted in the display process of the pixel island array 11 is transmitted through the first microlens array 10 and then incident into a human eye through the second lens 12.

For example, as illustrated in FIGS. 3A to 3C, in a direction perpendicular to the first substrate 101, the pixel island array 11 is on the first side of the first substrate 101, the first microlens array 10 is on a second side of the first substrate 101, and the second side of the first substrate 101 faces the user viewing side A of the display panel 100, that is, a display surface of the pixel island array 11 may face the human eye 35. The second lens 12 is on a side of the first microlens array 10 which is away from the first substrate 101.

For example, as illustrated in FIGS. 3A to 3C, the display panel 100 further includes a third microlens array 13. The third microlens array 13 is configured to compensate the deflection effect of the first microlens array 10 on ambient light so as to prevent crosstalk of the first polarized light emitted from the pixel island array 11 by the ambient light. The third microlens array 13 is on the first side of the first substrate 101. For example, the third microlens array 13 is on a side of the pixel island array 11 which is away from the first substrate 101.

For example, in a direction perpendicular to the first substrate 101, a center of the first microlens array 10 is aligned with a center of the third microlens array 13.

For example, the third microlens array 13 includes a plurality of third microlenses, and the plurality of first microlenses correspond the plurality of third microlenses one by one. For example, as illustrated in FIGS. 3A and 3B, the plurality of third microlenses include a third microlens 13a, a third microlens 13b, a third microlens 13c and a third microlens 13d, and the third microlens 13a corresponds to the first microlens 10a, the third microlens 13b corresponds to the first microlens 10b, the third microlens 13c corresponds to the first microlens 10c, and the third microlens 13d corresponds to the first microlens 10d.

For example, in a direction perpendicular to the first substrate 101, each of the first microlenses is arranged to overlap a corresponding third microlens. As illustrated in FIGS. 3A and 3B, the third microlens 13a completely overlaps the first microlens 10a, the third microlens 13b completely overlaps the first microlens 10b, the third microlens 13c completely overlaps the first microlens 10c, and the third microlens 13d completely overlaps the first microlens 10d.

For example, the shape, material, refractive index or the like of the plurality of third microlenses may be designed according to actual application scenarios, and the embodiments of the present disclosure are not limited to this. For example, the shape, material, refractive index or the like of the plurality of third microlenses may be the same.

For example, the refractive index of each of the first microlenses is the same as that of each third microlens, that is, the first microlens and the third microlens are made of a same material.

For example, as illustrated in FIGS. 3A to 3C, each of the first microlenses is a convex lens, and accordingly, each third microlens may be a concave lens.

For example, in this example, ambient light is filtered by the first polarizer 14 so as to obtain second polarized light having a second polarization direction. The second polarized light passes through the third lens array 13, the first lens array 10 and the second lens 12 in sequence and finally enters the human eye 35. For the second polarized light, the combination of the third lens array 13 and the first lens array 10 is equivalent to a flat plate, so that an optical path of the second polarized light after passing through the third lens array 13 and the first lens array 10 remains unchanged and still propagates along a straight line. Meanwhile, because the second lens 12 does not modulate the second polarized light, thus, after the second polarized light passes through the third lens array 13, the first lens array 10 and the second lens 12 in sequence, it's optical path remains unchanged and propagates along a straight line, so that the ambient light does not interfere with the first polarized light emitted by the pixel island array 11, and the human eye may see scenes outside the display panel 100. The display panel 100 may implement augmented reality display.

For example, as illustrated in FIGS. 3A to 3C, the display panel 100 further includes a first flat layer 15. The first flat layer 15 is on a side of the pixel island array 11 which is away from the first substrate 101, and between the pixel island array 11 and the third microlens array 13. The first flat layer 15 is used for planarization in order to form the third microlens array 13 thereon, and meanwhile, the first flat layer 15 may isolate the pixel island array 11 and the third microlens array 13.

For example, the first flat layer 15 may be made of an insulating material.

For example, as illustrated in FIGS. 3A to 3C, the display panel 100 further includes a second flat layer 16. The second flat layer 16 is on a side of the third microlens array 13 which is away from the first flat layer 15, and between the third microlens array 13 and the first polarizer 14.

For example, the refractive index of the second flat layer 16 is different from the refractive index of the third microlens array 13 so as to ensure that the third microlens array 13 may compensate the deflection effect of the first microlens array 10 on the ambient light and prevent the influence of the ambient light on the display effect of the display panel 100.

For example, the second flat layer 16 may also be made of an insulating material.

It should be noted that the pixel island array, the first microlens array and the third microlens array illustrated in FIGS. 3A, 3B, 3C, and 5 are all schematic, and the actual number, arrangement, shape or the like of the pixel island array, the first microlens array and the third microlens array may be designed according to actual needs, and the present disclosure is not limited to this.

Figure 7A:
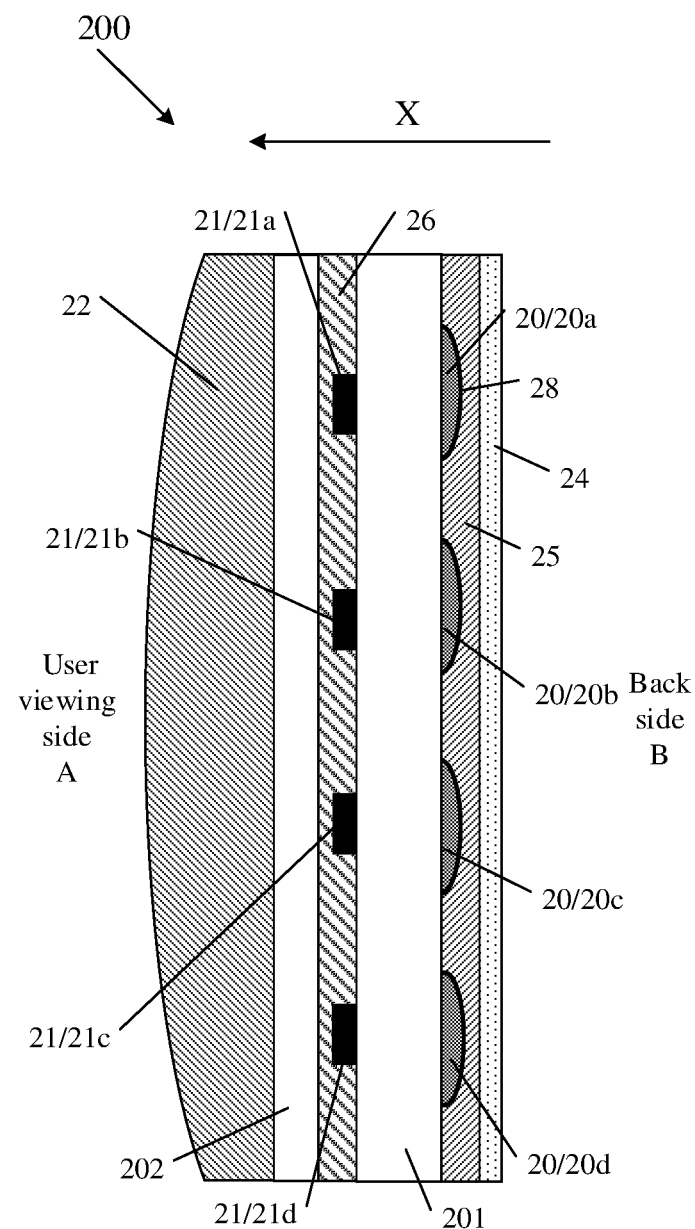
FIG. 7A is a schematic diagram of a structure of another display panel provided by an embodiment of the present disclosure.
Figure 7B:
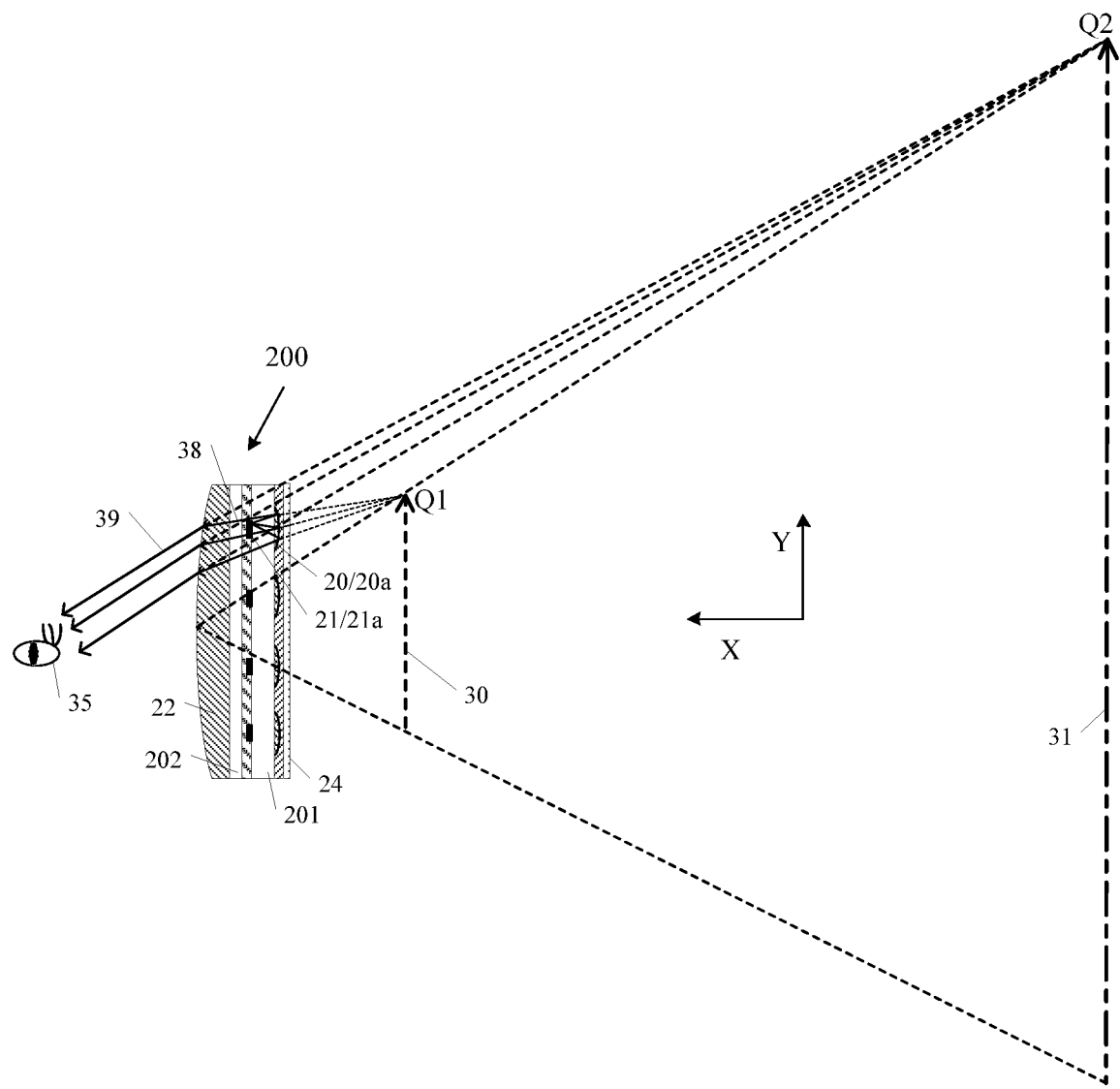
FIG. 7B is a schematic diagram of imaging of another display panel provided by an embodiment of the present disclosure.

FIG. 7A is a schematic diagram of a structure of another display panel provided by an embodiment of the present disclosure, and FIG. 7B is a schematic diagram of imaging of another display panel provided by an embodiment of the present disclosure.

For example, as illustrated in FIGS. 7A and 7B, other embodiments of the present disclosure provide a display panel 200, and the display panel 200 may include a first microlens array 20, a pixel island array 21 and a second lens 22. The pixel island array 21 is configured to display a plurality of sub-original images, and the first microlens array 20 is configured to converge light emitted from the plurality of sub-original images so as to obtain imaging light 38 which is capable of forming a first virtual image 30 on a side of the first microlens array 20 which is away from a user viewing side A of the display panel 200. Relative to the first microlens array 20, the second lens 22 is on the user viewing side of the display panel 200, and the second lens 22 is configured to converge the imaging light 38 so as to obtain a second virtual image 31. The first virtual image 30 is a virtual image in which a plurality of sub-original images are stitched and enlarged, and the second virtual image 31 is an enlarged virtual image of the first virtual image 30.

For example, as illustrated in FIGS. 7A and 7B, the display panel 100 further includes a first substrate 201 and a second substrate 202. The first microlens array 20 and the pixel island array 21 are both arranged on the first substrate 201, and the second lens 22 is arranged on the second substrate 202.

For example, the first microlens array 20 has a reflective structure. In a direction perpendicular to the first substrate 201, the pixel island array 21 is between the first microlens array 20 and the second lens 22. Light emitted by the pixel island array 21 in the display process is reflected and converged by the first microlens array 20, and then incident into a human eye through the second lens 22.

For example, the first microlens array 20 includes a plurality of first microlenses, and the pixel island array 21 includes a plurality of pixel islands. In the example illustrated in FIG. 7A, the first microlens array 20 includes a first microlens 20a, a first microlens 20b, a first microlens 20c and a first microlens 20d, and the pixel island array 21 includes a first pixel island 21a, a second pixel island 21b, a third pixel island 21c and a fourth pixel island 21d. The first microlens 20a corresponds to the first pixel island 21a, the first microlens 20b corresponds to the second pixel island 21b, the first microlens 20c corresponds to the third pixel island 21c, and the first microlens 20d corresponds to the fourth pixel island 21d.

For example, as illustrated in FIG. 7A, a surface of the plurality of first microlenses which is away from the pixel island array 21 has a transflective film 28. When light emitted from the pixel island array 21 is incident on the transflective film 28, part of the light emitted from the pixel island array 21 is reflected, and the reflected part of the light (the reflected part of the light is the imaging light 38 in FIG. 7B) is converged through the second lens 22 and finally enters a human eye. The other part of the light emitted by the pixel island array 21 is transmitted out, and the transmitted part of the light does not participate in imaging. With respect to ambient light from a back side B of the display panel 200, when the ambient light is incident on the transflective film 28, part of the ambient light is reflected, while the other part of the ambient light is transmitted and finally incident into the human eye, so that the human eye may see external objects. The transflective film 28 may increase the ambient light incident into the human eye, thereby increasing the transparency and enhancing the effect of augmented reality display.

For example, the pixel island array 21 and the first microlens array 20 are respectively on both sides of the first substrate 201, the pixel island array 21 is on a second side of the first substrate 201, and the first microlens array 20 is on a first side of the first substrate 201. For example, the second side of the first substrate 201 faces the user viewing side A of the display panel 200, and the first side of the first substrate 201 faces the back side B which is opposite to the user viewing side A of the display panel 200.

For example, as illustrated in FIG. 7A, the display panel 200 further includes a first polarizer 24, and the first polarizer 24 is on a side of the first microlens array 20 which is away from the first substrate 201. The first polarizer 24 is configured to filter the ambient light incident from the back side B which is opposite to the user viewing side A of the display panel 200 so as to obtain second polarized light having a second polarization direction, thereby ensuring that ambient light transmitted through the entire display panel 200 is not modulated by the second lens 22.

For example, as illustrated in FIG. 7A, the display panel 200 further includes a compensation layer 25. The compensation layer 25 is between the first microlens array 20 and the first polarizer 24. The compensation layer 25 is used to planarize the first microlens array 20 so as to compensate the deflection effect of the first microlens array 20 on ambient light and ensure that the ambient light does not interfere with the imaging effect of the display panel 200.

For example, the compensation layer 25 is in direct contact with the first microlens array 20, and the refractive index of the first microlens array 20 and the refractive index of the compensation layer 25 are the same. For the ambient light (i.e., the second polarized light) incident through the first polarizer 24, the first microlens array 20 and the compensation layer 25 are equivalent to forming a flat plate, thus the second polarized light may pass through the first microlens array 20 and the compensation layer 25 without deflection, that is, the optical path of the second polarized light after passing through the compensation layer 25 and the first microlens array 20 is unchanged, and still propagates along a straight line. Meanwhile, because the second lens 22 has no modulation effect on the second polarized light. Therefore, after the second polarized light passes through the first lens array 10, the compensation layer 25 and the second lens 22 in sequence, it's optical path is unchanged and propagates along a straight line, so that it is ensured that ambient light does not interfere with the first polarized light emitted by the pixel island array 21, and the human eye may see scenes outside the display panel 200. The display panel 200 may implement augmented reality display.

For example, as illustrated in FIG. 7B, the imaging process of the first microlens array 20 and the second lens 22 is described by taking Q1 point in the first virtual image 30 as an example. Light emitted from a point in the first pixel island 21a in the pixel island array 21 is imaged as Q1 point in the first virtual image 30 through the first microlens 20a in the first microlens array 20, and Q1 point in the first virtual image 30 is imaged as Q2 point in the second virtual image 31 through the second lens 22. As illustrated in FIG. 7B, the first polarized light emitted from a point in the first pixel island 21a is reflected and converged through the first microlens 20a so as to obtain imaging light 38 (e.g., the first imaging light). Reverse extension lines of the first imaging light 38 may converge at Q1 point in the first virtual image 30, the first imaging light 38 is incident into the second lens 22, and its optical path is deflected when the first imaging light 38 passes through the second lens 22. Light exited from the second lens 22 is second imaging light 39, and the second imaging light 39 may be incident into the human eye 35. Reverse extension lines of the second imaging light 39 may converge at Q2 point in the second virtual image 31. Finally, the human eye 35 may see Q2 point in the second virtual image 31. The first imaging light 38 and the second imaging light 39 are both polarized light having a first polarization direction.

It should be noted that in the example illustrated in FIG. 7B, the first polarized light emitted by a pixel point in the first pixel island 21a is reflected by the first microlens 20a, and then the reflected first polarized light enters the human eye 35 through the second lens 22. The solid line with arrow in FIG. 7B indicates a propagation path of the actual light, while the dashed line indicates a reverse extension line of the actual light.

It should be noted that the detailed description of the first microlens array 20, the pixel island array 21, the second lens 22, the first substrate 201, the second substrate 202, the first polarizer 24 or the like illustrated in FIGS. 7A and 7B may refer to the related description of the first microlens array 10, the pixel island array 11, the second lens 12, the first substrate 101, the second substrate 102 and the first polarizer 14 in the embodiments above illustrated in FIGS. 3A to 3C, which will not be repeated here.

Similarly, for other examples of the embodiments illustrated in FIGS. 7A and 7B, there may be no second substrate, so that the second lens or the like may be directly laminated and formed on the first substrate.

Figure 8A:
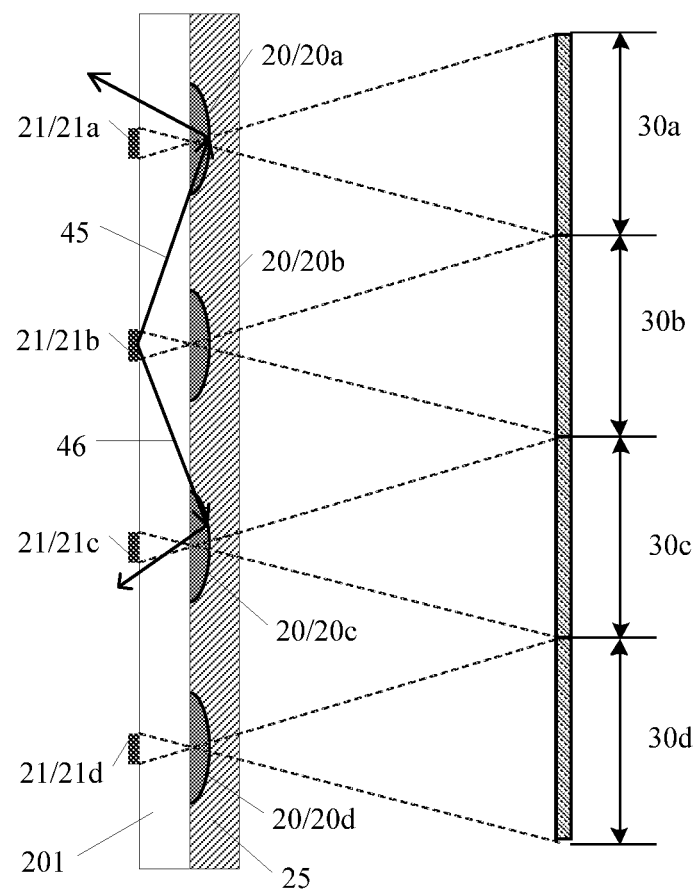
FIG. 8A is a schematic diagram of yet another display panel provided by an embodiment of the present disclosure.
Figure 8B:
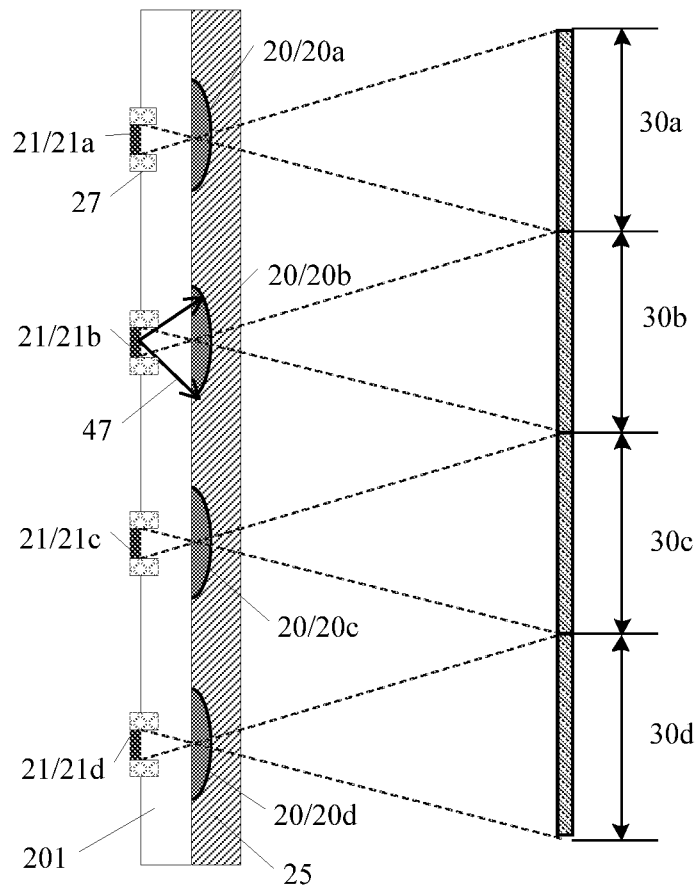
FIG. 8B is a schematic diagram of still another display panel provided by an embodiment of the present disclosure.
Figure 8C:
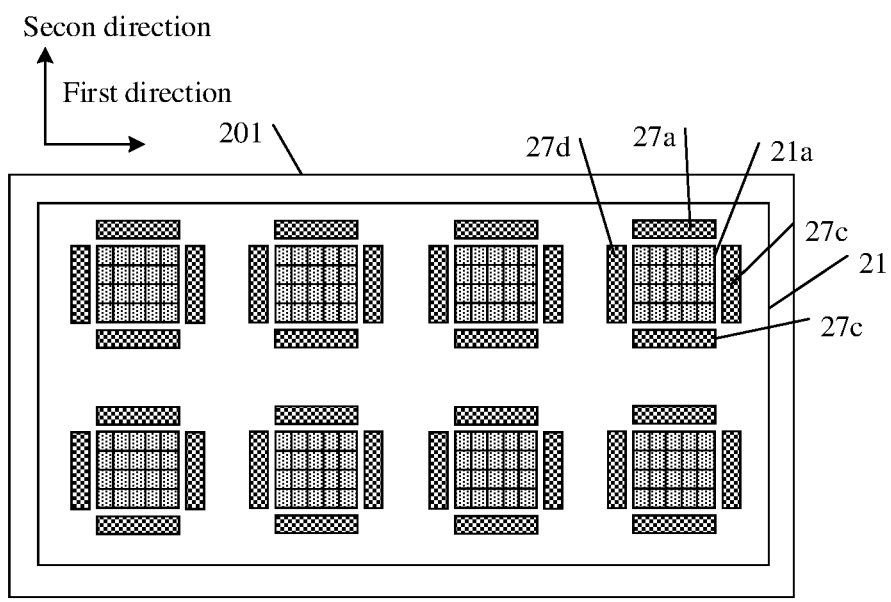
FIG. 8C is a schematic plan view of still another display panel provided by an embodiment of the present disclosure.

FIG. 8A is a schematic diagram of yet another display panel provided by an embodiment of the present disclosure, FIG. 8B is a schematic diagram of still another display panel provided by an embodiment of the present disclosure, and FIG. 8C is a schematic plan view of still another display panel provided by an embodiment of the present disclosure.

In general, light emitted by each pixel in the pixel island array 21 propagates in the range of −90 degrees to +90 degrees, that is, the divergence angle of the light emitted by the pixel islands is large, and the light emitted by adjacent pixel islands may affect each other. For example, part of the light emitted by a pixel island may enter an area of a first microlens which does not correspond to the pixel island, and this part of the light may become interference light, thereby affecting the imaging effect of the first microlens which does not correspond to the pixel island, and finally affecting the visual effect of the augmented reality display. The following description will be illustrated by taking the display panel illustrated in FIGS. 7A and 7B as an example.

As illustrated in FIG. 8A, the first microlens 20a converges the light emitted from the image displayed by the first pixel island 21a so as to obtain first sub-imaging light which is capable of being imaged as the first sub-virtual image 30a, the first microlens 20b converges the light emitted from the image displayed by the second pixel island 21b so as to obtain second sub-imaging light which is capable of being imaged as the second sub-virtual image 30b, the first microlens 20c converges the light emitted from the image displayed by the third pixel island 21c so as to obtain third sub-imaging light which is capable of being imaged as the third sub-virtual image 30c, and the first microlens 20d converges the light emitted from the image displayed by the fourth pixel island 21d so as to obtain fourth sub-imaging light which is capable of being imaged as the fourth sub-virtual image 30d. Because the divergence angle of the light emitted from a pixel island is too large, for example, part of the light 45 emitted from the second pixel island 21b may be transmitted to the first microlens 20a, and the part of the light 45 and the first sub-imaging light converged through the first microlens 20a form the first sub-virtual image 30a, whereby the part of the light 45 may affect the first sub-virtual image 30a. Another part of light 46 emitted from the second pixel island 21b is transmitted to the first microlens 20c, and this part of light 46 and the third sub-imaging light converged through the first microlens 20c form the third sub-virtual image 30c, whereby the part of light 46 may affect the third sub-virtual image 30c.

It should be noted that in the embodiments of the present disclosure, "light emitted from an image" means light emitted from each pixel in the pixel island by which the image is displayed.

Based on this, in some embodiments of the present disclosure, as illustrated in FIG. 8B, the display panel 200 further includes a shielding layer 27. The shielding layer 27 is arranged between adjacent pixel islands in a direction parallel to the display panel, i.e., in a direction parallel to the first substrate 201, and configured to prevent light emitted from adjacent pixel islands from interfering with each other. The shielding layer 27 may limit the divergence angle of the light emitted from the pixel island, thereby preventing the light emitted from adjacent pixel islands from interfering with each other, reducing stray light, and improving the imaging effect and visual effect.

For example, the shielding layer 27 includes a plurality of sub-shielding units, and each pixel island is partially surrounded by at least one sub-shielding unit in a direction parallel to the display panel, i.e., in a direction parallel to the first substrate 201. As illustrated in FIG. 8B, each pixel island is surrounded by two sub-shielding units, so that, for example, the divergence angle of light 47 emitted from the second pixel island 21b is limited, and all of the light 47 are transmitted to the first microlens 20b which corresponds to the second pixel island 21b, and not to the first microlenses (e.g., the first microlens 20a and the first microlens 20c) which correspond to the pixel islands adjacent thereto (e.g., the first pixel island 21a and the third pixel island 21c).

For example, the shape, thickness, material or the like of the shielding layer 27 may be designed according to actual application requirements, as long as the shielding layer 27 may prevent light emitted from different pixel islands from interfering with each other, and the present disclosure is not limited to this. For example, each sub-shielding unit in the shielding layer 27 may be a rectangular column. The shielding layer 27 may be made of an opaque material such as a dark color (e.g., black) resin. Alternatively, the shielding layer 27 may be a polarizer, and a transmission axis of the shielding layer 27 is, for example, perpendicular to the first polarization direction, so that the first polarized light having the first polarization direction emitted from the pixel island array 11 cannot pass through the shielding layer 27.

For example, as illustrated in FIG. 8C, in some examples, each pixel island is surrounded by four sub-shielding units. The shielding layer 27 may include a first sub-shielding unit 27a, a second sub-shielding unit 27b, a third sub-shielding unit 27c and a fourth sub-shielding unit 27d. The first sub-shielding unit 27a, the second sub-shielding unit 27b, the third sub-shielding unit 27c and the fourth sub-shielding unit 27d surround the first pixel island 21a, thereby ensuring that light emitted from the first pixel island 21a is not transmitted to the first microlenses which correspond to other pixel islands, in a first direction and a second direction. For example, the first direction and the second direction are perpendicular. As illustrated in FIG. 8C, in the first direction, two sub-shielding units are provided between two adjacent pixel islands, and in the second direction, two sub-shielding units are also provided between two adjacent pixel islands, and the present disclosure is not limited to this. For example, in other examples, only one sub-shielding unit may be provided between two adjacent pixel islands in the first direction, and only one sub-shielding unit may be provided between two adjacent pixel islands in the second direction.

It should be noted that the display panel 100 illustrated in FIGS. 3A to 3C may also include a shielding layer so as to prevent light emitted from different pixel islands from interfering with each other.

In the above drawings illustrating the embodiments of the present disclosure, although only one second lens is illustrated on the user viewing side of the display panel, a plurality of second lenses may be provided on the user viewing side so as to implement the imaging function, and the embodiments of the present disclosure are not limited to this.

Figure 9:
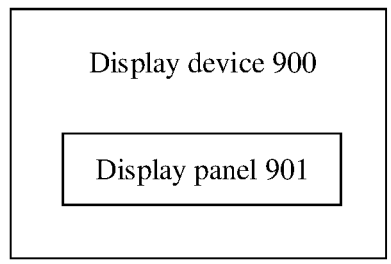
FIG. 9 is a schematic block diagram of a display device provided by an embodiment of the present disclosure.

An embodiment of the present disclosure also provides a display device, and FIG. 9 is a schematic block diagram of a display device provided by an embodiment of the present disclosure. As illustrated in FIG. 9, a display device 900 includes a display panel 901, which may be the display panel according to any one of the embodiments described above.

For example, the display device 900 may be an augmented reality display device, and the augmented reality display device may include a head-mounted display such as AR glasses or the like.

It should be understood that there are other components of the display device 900 (e.g., control device, image data encoding/decoding device, processor, etc.) by those of ordinary skill in the art, which are not repeated here, and should not be taken as limitations to the present disclosure.

Figure 10:
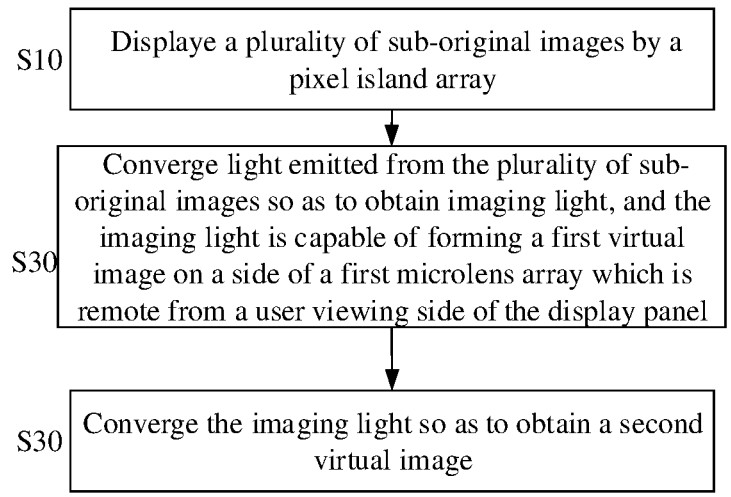
FIG. 10 is a flowchart of a display method provided by an embodiment of the present disclosure.
Figure 11A:
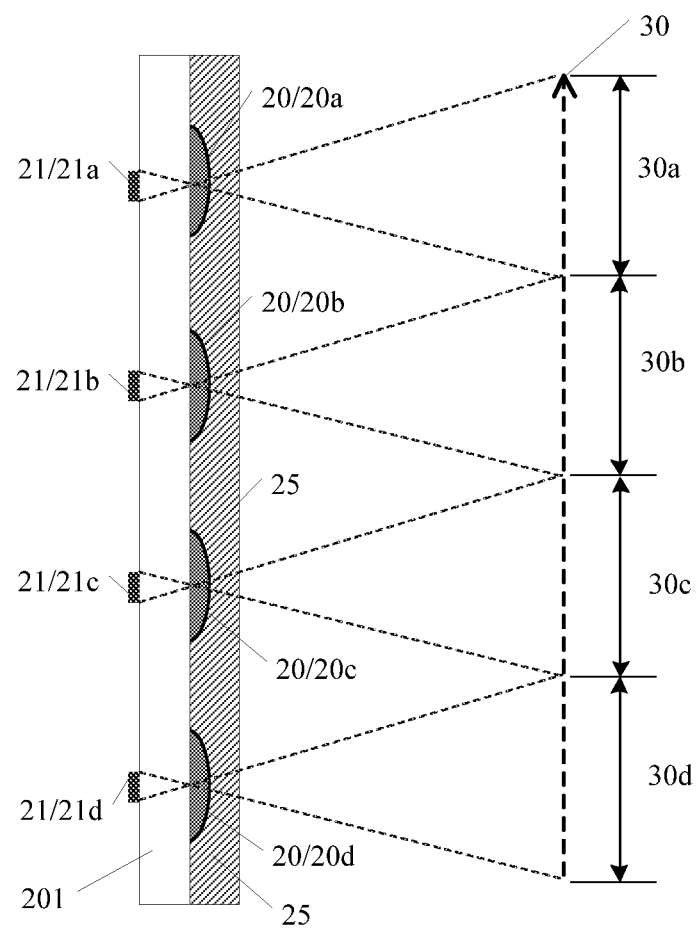
FIG. 11A is a schematic diagram of imaging of step S20 in the display method illustrated in FIG. 10.
Figure 11B:
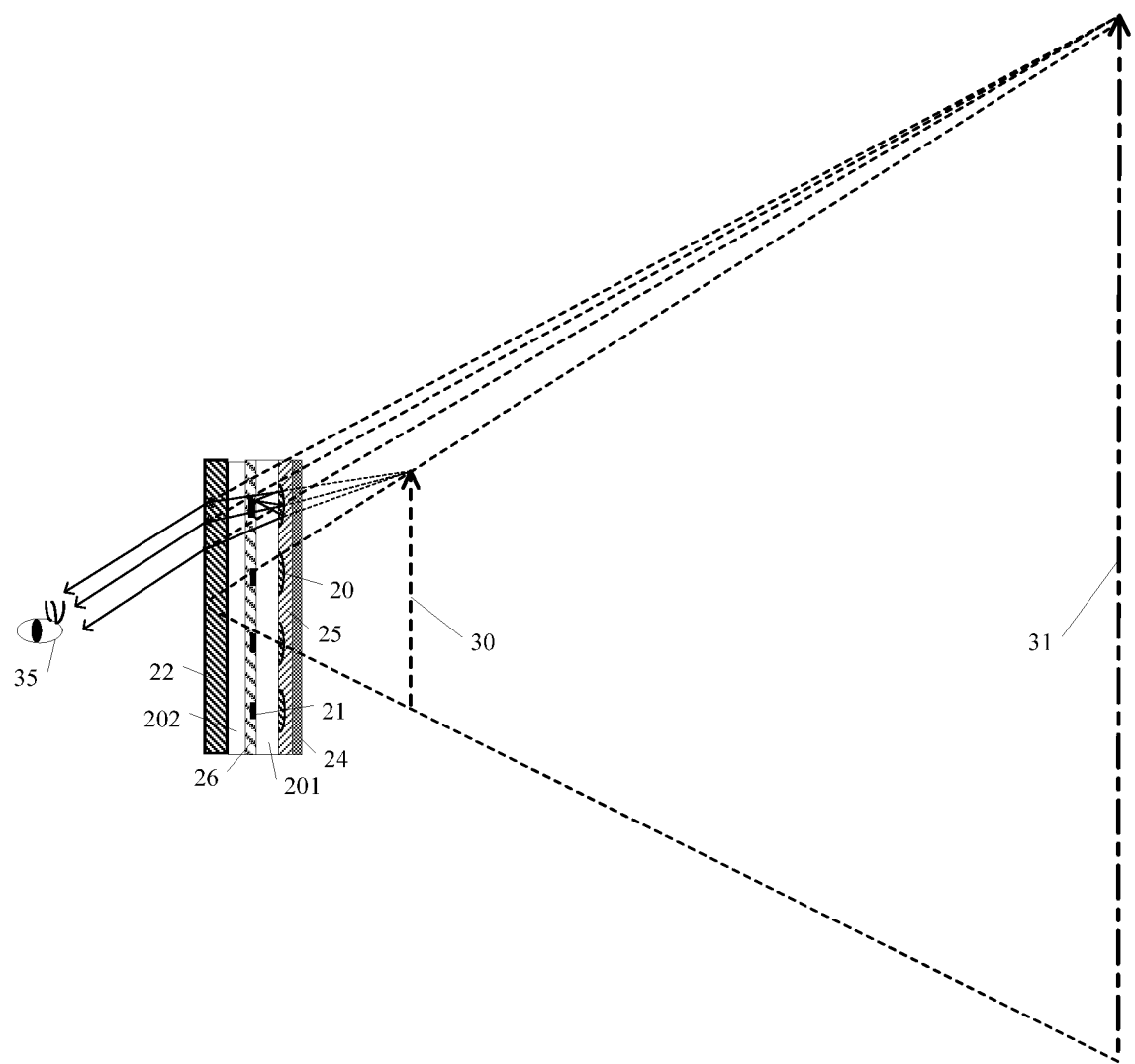
FIG. 11B is a schematic diagram of imaging of step S30 in the display method illustrated in FIG. 10.

An embodiment of the present disclosure also provides a display method, which may be applied to the display panel according to any of the above embodiments. FIG. 10 is a flowchart of a display method provided by an embodiment of the present disclosure, FIG. 11A is a schematic diagram of imaging of step S20 in the display method illustrated in FIG. 10, and FIG. 11B is a schematic diagram of imaging of step S30 in the display method illustrated in FIG. 10.

For example, as illustrated in FIG. 10, the display method may include the following steps:

S10: a plurality of sub-original images are displayed by a pixel island array;

S20: light emitted from the plurality of sub-original images is converged so as to obtain imaging light, and a first virtual image is formed by the imaging light on a side of a first microlens array which is away from a user viewing side of the display panel;

S30: the imaging light is converged so as to obtain a second virtual image.

For example, in step S10, each pixel island in the pixel island array may be controlled to display sub-original images according to actual requirements, and the plurality of sub-original images form a complete original image.

For example, the first virtual image is a virtual image in which the plurality of sub-original images are stitched and enlarged.

For example, in step S20, the imaging light includes a plurality of sub-imaging light, a plurality of first microlenses in the first microlens array 20 respectively converge the light emitted from the plurality of sub-original images so as to obtain the plurality of sub-imaging light, the plurality of sub-imaging light may be respectively imaged as a plurality of sub-virtual images, and the plurality of sub-virtual images are stitched to form a consecutive first virtual image. As illustrated in FIG. 11A, the first microlens array 20 includes a first microlens 20a, a first microlens 20b, a first microlens 20c and a first microlens 20d, and the pixel island array 21 includes a first pixel island 21a, a second pixel island 21b, a third pixel island 21c and a fourth pixel island 21d. The first pixel island 21a displays a first sub-original image, the first microlens 20a converges light emitted from the first sub-original image so as to obtain first sub-imaging light, the first sub-imaging light is capable of forming a first sub-virtual image 30a, and the first sub-virtual image 30a is an enlarged virtual image of the first sub-original image. The second pixel island 21b displays a second sub-original image, the first microlens 20b converges light emitted from the second sub-original image so as to obtain second sub-imaging light, the second sub-imaging light is capable of forming a second sub-virtual image 30b, and the second sub-virtual image 30b is an enlarged virtual image of the second sub-original image. The third pixel island 21c displays a third sub-original image, the first microlens 20c converges light emitted from the third sub-original image so as to obtain third sub-imaging light, the third sub-imaging light is capable of forming a third sub-virtual image 30c, and the third sub-virtual image 30c is an enlarged virtual image of the third sub-original image. The fourth pixel island 21d displays a fourth sub-original image, the first microlens 20d converges light emitted from the fourth sub-original image so as to obtain fourth sub-imaging light, the fourth sub-imaging light is capable of forming a fourth sub-virtual image 30d, and the fourth sub-virtual image 30d is an enlarged virtual image of the fourth sub-original image. The first sub-virtual image 30a, the second sub-virtual image 30b, the third sub-virtual image 30c and the fourth sub-virtual image 30d are stitched for obtaining a consecutive first virtual image 30, and the first virtual image 30 is an enlarged virtual image of the complete original image displayed by the pixel island array 21.

For example, as illustrated in FIG. 11A, the display panel further includes a compensation layer 25 for balancing the deflection effect of the first microlens array 20 on ambient light.

For example, in step S30, the second lens converges the imaging light so as to obtain the second virtual image, and the second virtual image is an enlarged virtual image of the first virtual image. As illustrated in FIG. 11B, the second lens 22 may be a liquid crystal flat lens. The first polarized light emitted from the pixel island array 21 is reflected and converged by the first microlens array 20, the reflected first polarized light is incident into the second lens 22, and when the reflected first polarized light passes through the second lens 22, its optical path is deflected, so that the light exited through the second lens 22 may be transmitted to the human eye 35, and the human eye 35 finally sees the complete second virtual image 31. For example, as illustrated in FIG. 11B, the display panel further includes a first polarizer 24. The first polarizer 24 is used for filtering ambient light incident from the back side which is opposite to the user viewing side of the display panel so as to obtain second polarized light having a second polarization direction, and the second lens 22 has no modulation effect on the second polarized light, so that ambient light transmitted through the entire display panel is not modulated by the second lens 22, thereby ensuring the display effect of augmented reality display.

For the present disclosure, the following statements should be noted:

(1) The accompanying drawings involve only the structure(s) in connection with the embodiment(s) of the present disclosure, and for other structure(s), reference can be made to common design(s).

(2) The embodiments of the present disclosure and features in the embodiments may be combined with each other to obtain new embodiments if they do not conflict with each other.

The above description is only specific implementation of the present disclosure, but the scope of the present disclosure is not limited to this, and the scope of the present disclosure is defined by the accompanying claims.

What is claimed is:

1. A display panel, comprising: a first microlens array, a pixel island array and a second lens, and
   wherein the pixel island array is configured to display a plurality of sub-original images;
   the first microlens array is configured to converge light emitted from the plurality of sub-original images so as to obtain imaging light, and a first virtual image is formed by the imaging light on a side of the first microlens array which is away from a user viewing side of the display panel; and
   the second lens is on the user viewing side of the display panel relative to the first microlens array, and the second lens is configured to converge the imaging light so as to obtain a second virtual image, wherein the first virtual image is a virtual image in which the plurality of sub-original images are stitched and enlarged, and the second virtual image is an enlarged virtual image of the first virtual image.

2. The display panel according to claim 1, wherein the second lens is a polarized lens, configured to modulate incident light having a first polarization direction and transmit incident light having a second polarization direction perpendicular to the first polarization direction,
   the pixel island array is configured to emit first polarized light having the first polarization direction; and the polarized lens comprises a liquid crystal lens or a lens made of a birefringent material.

3. The display panel according to claim 2, further comprising a first polarizer, and
   wherein the first polarizer is configured to filter ambient light incident from a back side which is opposite to the user viewing side of the display panel, so as to obtain second polarized light having the second polarization direction,
   wherein the first microlens array and the pixel island array are between the first polarizer and the second lens; and
   wherein a display surface of the pixel island array is provided with a second polarizer so as to exit the first polarized light having the first polarization direction.

4. The display panel according to claim 1, further comprising a first substrate, and wherein the first substrate is a transparent substrate,
the first microlens array and the pixel island array are on the first substrate;
a display surface of the pixel island array faces the first microlens array.

5. The display panel according to claim 4, wherein the first microlens array has a transmissive structure, and the first microlens array is between the pixel island array and the second lens in a direction perpendicular to the first substrate.

6. The display panel according to claim 4, further comprising a third microlens array, and
wherein the third microlens array is on a first side of the first substrate, the first side of the first substrate faces a back side which is opposite to the user viewing side of the display panel, and the third microlens array is configured to compensate for deflection effects of the first microlens array on ambient light.

7. The display panel according to claim 6, wherein a center of the first microlens array is aligned with a center of the third microlens array, in a direction perpendicular to the first substrate.

8. The display panel according to claim 6, wherein the first microlens array comprises a plurality of first microlenses, the third microlens array comprises a plurality of third microlenses, and the plurality of first microlenses correspond to the plurality of third microlenses one by one, and
each of the first microlenses is arranged to overlap a corresponding third microlens in a direction perpendicular to the first substrate.

9. The display panel according to claim 6, further comprising a first flat layer, and
wherein the first flat layer is on a side of the pixel island array which is away from the first substrate, and between the pixel island array and the third microlens array.

10. The display panel according to claim 9, further comprising a second flat layer, and
wherein the second flat layer is on a side of the third microlens array which is away from the first flat layer, and is between the third microlens array and a first polarizer, and
a refractive index of the second flat layer is different from a refractive index of the third microlens array.

11. The display panel according to claim 4, wherein the first microlens array has a reflective structure, and the pixel island array is between the first microlens array and the second lens in a direction perpendicular to the first substrate.

12. The display panel according to claim 11, wherein the first microlens array comprises a plurality of first microlenses, and a surface of the plurality of first microlenses which is away from the pixel island array has a transflective film.

13. The display panel according to claim 11, wherein the first microlens array is on a first side of the first substrate, the pixel island array is on a second side of the first substrate, the first side of the first substrate faces a back side which is opposite to the user viewing side of the display panel, the second side of the first substrate faces the user viewing side of the display panel, and a first polarizer is on a side of the first microlens array which is away from the first substrate.

14. The display panel according to claim 11, further comprising a compensation layer, and
wherein the compensation layer is between the first microlens array and a first polarizer, and is configured to compensate for deflection effects of the first microlens array on ambient light.

15. The display panel according to claim 14, wherein the first microlens array is in direct contact with the compensation layer, and refractive index of the first microlens array and refractive index of the compensation layer are the same.

16. The display panel according to claim 4, further comprising a second substrate, and
wherein the second substrate is a transparent substrate and is combined with the first substrate in parallel, the second substrate is closer to the user viewing side of the display panel relative to the first substrate, and the second lens is arranged on the second substrate; and
wherein the second lens is arranged on a side of the second substrate which is close to or away from the first substrate.

17. The display panel according to claim 1, wherein the pixel island array comprises a plurality of pixel islands spaced apart from each other, a gap between pixel islands allows ambient light from a back side of the display panel to pass through, and the back side of the display panel is opposite to the user viewing side of the display panel,
the first microlens array comprises a plurality of first microlenses, and the plurality of pixel islands correspond to the plurality of first microlenses one by one, and
each of the first microlenses is arranged to overlap a corresponding pixel island in a direction perpendicular to the display panel,
wherein a center of the pixel island array is aligned with a center of the first microlens array in the direction perpendicular to the display panel; and
wherein each pixel island comprises a plurality of pixels, and each pixel may be an organic light emitting diode pixel, an inorganic light emitting diode pixel, or a liquid crystal display pixel.

18. The display panel according to claim 17, further comprising a shielding layer, and
wherein the shielding layer is arranged between adjacent pixel islands in a direction parallel to the display panel and is configured to prevent light emitted from the adjacent pixel islands from interfering with each other; and
wherein the shielding layer comprises a plurality of sub-shielding units, and each pixel island is partially surrounded by at least one sub-shielding unit in the direction parallel to the display panel.

19. A display device, comprising the display panel according to claim 1.

20. A display method, applicable to the display panel according to claim 1, comprising:
displaying the plurality of sub-original images through the pixel island array;
converging the light emitted from the plurality of sub-original images so as to obtain the imaging light, wherein the imaging light is capable of forming the first virtual image on the side of the first microlens array which is away from the user viewing side of the display panel; and
converging the imaging light so as to obtain the second virtual image, wherein the first virtual image is the virtual image in which the plurality of sub-original images are stitched and enlarged, and the second virtual image is the enlarged virtual image of the first virtual image.

* * * * *